United States Patent
Martin et al.

(10) Patent No.: US 12,249,883 B2
(45) Date of Patent: Mar. 11, 2025

(54) ELECTRIC COMPONENT WITH RESIN DAM FOR CONDUCTIVE WINDING SLOT

(71) Applicant: General Electric Company, Schenectady, NY (US)

(72) Inventors: Matthew Robert Martin, Schenectady, NY (US); Karim Younsi, Ballston Lake, NY (US); Nolan Gregg Curwen, Schenectady, NY (US); Wei Zhang, Clifton Park, NY (US); John Russell Yagielski, Scotia, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 464 days.

(21) Appl. No.: 17/659,097

(22) Filed: Apr. 13, 2022

(65) Prior Publication Data

US 2023/0336045 A1    Oct. 19, 2023

(51) Int. Cl.
    *H02K 3/34*    (2006.01)
    *H02K 3/30*    (2006.01)
    *H02K 15/10*   (2006.01)

(52) U.S. Cl.
    CPC .............. *H02K 3/345* (2013.01); *H02K 3/30* (2013.01); *H02K 15/10* (2013.01)

(58) Field of Classification Search
    CPC ............ H02K 3/30; H02K 3/345; H02K 15/10
    USPC ........................................................ 310/215
    See application file for complete search history.

(56) References Cited

U.S. PATENT DOCUMENTS

| | | | |
|---|---|---|---|
| 8,212,449 B2 * | 7/2012 | Kouda | H02K 3/48 174/120 SR |
| 2014/0015349 A1 | 1/2014 | Chamberlin et al. | |
| 2017/0005537 A1 | 1/2017 | Matahira et al. | |
| 2020/0136445 A1 * | 4/2020 | Hoerz | H02K 9/227 |
| 2020/0156296 A1 * | 5/2020 | E Silva | H02K 3/345 |
| 2020/0161917 A1 * | 5/2020 | E Silva | H02K 3/24 |
| 2020/0161918 A1 * | 5/2020 | Almeida E Silva | H02K 3/345 |

(Continued)

FOREIGN PATENT DOCUMENTS

| | | |
|---|---|---|
| JP | S55125049 U | 9/1980 |
| JP | S563557 A | 1/1981 |

OTHER PUBLICATIONS

Extended European Search Report from European Patent Application No. 23167176.9 dated Sep. 29, 2023 (8 pages).

*Primary Examiner* — Rashad H Johnson
(74) *Attorney, Agent, or Firm* — Charlotte Wilson; James Pemrick; Hoffman Warnick LLC

(57) ABSTRACT

An electric component for an electric machine includes a body having slots defined therein, and a conductive winding extending out of axial end(s) of the slot(s). The electric component may include any electric machine component having conductive windings, e.g., a stator for a generator. The electric component includes a resin dam around the conductive winding at axial end(s) of the slot(s). The resin dam blocks liquid communication through at least a space between the conductive winding and an inner surface of the slot(s), during manufacture. The electric component also includes a (solidified) insulating resin in the slot(s) and against the resin dam(s) at the axial end(s) of the slot(s). Any number of the conductive windings and slots may include a resin dam, e.g., one, some or all. The resin dams ensure complete filling of the slots and encapsulation of the conductive windings.

26 Claims, 15 Drawing Sheets

(56) References Cited

U.S. PATENT DOCUMENTS

| | | | |
|---|---|---|---|
| 2020/0161947 A1* | 5/2020 | Almeida E Silva | H02K 15/105 |
| 2020/0295617 A1* | 9/2020 | Cunningham | H02K 3/487 |
| 2021/0036568 A1* | 2/2021 | Schulz | H02K 3/12 |
| 2021/0367483 A1* | 11/2021 | Yin | H02K 3/34 |
| 2022/0014062 A1* | 1/2022 | Almeida E Silva | H02K 9/227 |
| 2022/0021259 A1* | 1/2022 | Almeida E Silva | H02K 9/19 |
| 2023/0054794 A1* | 2/2023 | Fatemi | H02K 3/345 |
| 2023/0336045 A1* | 10/2023 | Martin | H02K 3/345 |
| 2024/0006947 A1* | 1/2024 | Nishikawa | H02K 1/04 |

* cited by examiner

ELECTRIC COMPONENT WITH RESIN DAM FOR CONDUCTIVE WINDING SLOT

TECHNICAL FIELD

The disclosure relates generally to electric machines, and more particularly, to liquid resin retention during manufacture using a resin dam around a conductive winding at an axial end of a conductive winding slot in an electric component of an electric machine.

BACKGROUND

Electric machines may include a stator and a rotor. One or both of the stator and rotor may include conductive windings or coils therein. The conductive windings are positioned in a plurality of slots defined within a magnetic body of the electric component, e.g., stator or rotor. In an electric motor, the conductive windings around the magnetic body of the electric component can create rotational motion in the rotor when current is directed through the windings. Conversely, in a generator, when the rotor is rotated, creates electric current in the conductive windings. The conductive windings are held in position and are electrically insulated in the slots by insulating tapes or slot liners treated by an insulating resin. During manufacture of the electric machine, a vacuum pressure impregnation (VPI) process is conducted to apply the insulating resin. During the VPI process, the resin is applied to the slots in a liquid form, and a vacuum is applied to force the resin to penetrate and encapsulate the conductive windings in the slots. A pressurization process may follow the initial application to further impregnate the conductive windings in the slots. Subsequently, the electric component is exposed to a thermal curing process at a high temperature, e.g., a baking process, to cure the insulating resin. It can be a challenge to retain the liquid insulating resin around the conductive windings and in the slot during and after the VPI process. It can be especially challenging to retain the liquid insulating resin during the thermal curing process because the high temperatures lower the viscosity of the insulating resin, i.e., prior to curing. The thermal curing process may also include rotating the electric component, resulting in progressive application of gravity on the liquid insulating resin in all of the slots across the entire electric component. The lack of retention of the liquid insulating resin in the slots can create thinly insulated areas and/or voids in the insulating resin around parts of the conductive winding, which can result in poor performance of the electric machine.

BRIEF DESCRIPTION

All aspects, examples and features mentioned below can be combined in any technically possible way.

An aspect of the disclosure provides an electric component for an electric machine, the electric component comprising: a body having a slot defined therein; a conductive winding extending out of a first axial end of the slot; a first resin dam around the conductive winding at the first axial end of the slot, wherein the first resin dam blocks liquid communication through at least a space between the conductive winding and an inner surface of the slot at the first axial end of the slot; and an insulating resin in the slot and against the first resin dam at the first axial end of the slot.

Another aspect of the disclosure includes any of the preceding aspects, and the first resin dam includes a length of flexible material wrapped around the conductive winding at the first axial end of the slot.

Another aspect of the disclosure includes any of the preceding aspects, and the flexible material includes a fabric including interstitial spaces therein and the insulating resin is embedded in interstitial spaces of the fabric.

Another aspect of the disclosure includes any of the preceding aspects, and the length of flexible material also extends between the conductive winding and a bottom of the slot.

Another aspect of the disclosure includes any of the preceding aspects, and the length of flexible material also extends over a radially inner side of the conductive winding in the slot.

Another aspect of the disclosure includes any of the preceding aspects, and the length of flexible material also extends over a radially inner side of the conductive winding in the slot.

Another aspect of the disclosure includes any of the preceding aspects, and the slot in the electric component includes a plurality of slots in the electric component, each slot including the conductive winding extending out of the first axial end thereof, and wherein the first resin dam includes a plurality first resin dams, one first resin dam extending around the conductive winding at the first axial end of each slot of the plurality of slots, and wherein the insulating resin is in each slot and around each first resin dam at the first axial end of each slot.

Another aspect of the disclosure includes any of the preceding aspects, and the first resin dams include at least one length of flexible material wrapped around the conductive winding at the first axial end of each slot of the plurality of slots.

Another aspect of the disclosure includes any of the preceding aspects, and further comprising a second resin dam around the conductive winding at a second axial end of the slot opposite the first axial end, wherein the conductive winding extends out of the second axial end of the slot and the second resin dam blocks liquid communication through at least a space between the conductive winding and the inner surface of the slot at the second axial end of the slot.

Another aspect of the disclosure includes any of the preceding aspects, and the first resin dam and the second resin dam include a length of flexible material wrapped around the conductive winding at the first axial end of the slot and at the second axial end of the slot.

Another aspect of the disclosure includes any of the preceding aspects, and the first resin dam includes a dam member extending radially from the conductive winding at a location configured to abut the first axial end of the slot.

Another aspect of the disclosure includes any of the preceding aspects, and the conductive winding includes a conductive core and an insulative covering over the conductive core, and the dam member includes a flexible material extending at least partially under the insulative covering of the conductive winding.

Another aspect of the disclosure includes any of the preceding aspects, and the first resin dam includes a fastener configured to couple the dam member to an exterior surface of the conductive winding.

An aspect of the disclosure includes an electric machine having an axis, the electric machine comprising: an electric component including a plurality of slots defined in a body thereof, each slot extending radially and axially relative to the axis of the electric machine; a conductive winding in each slot and extending out of a first axial end of each slot; a first resin dam at the first axial end of at least one slot of the plurality of slots and around the conductive winding in the at least one slot, wherein the first resin dam blocks liquid communication through at least a space between the conductive winding and an inner surface of the at least one slot at the first axial end of the at least one slot; and an insulating resin in the at least one slot and against the first resin dam.

Another aspect of the disclosure includes any of the preceding aspects, and the first resin dam includes a length of flexible material wrapped around the conductive winding at the first axial end of the at least one slot.

Another aspect of the disclosure includes any of the preceding aspects, and the flexible material includes a fabric having interstitial spaces therein and the insulating resin is embedded in the interstitial spaces of the fabric.

Another aspect of the disclosure includes any of the preceding aspects, and the length of flexible material also extends between the conductive winding and a bottom of a respective slot in which the conductive winding is located.

Another aspect of the disclosure includes any of the preceding aspects, and the length of flexible material also extends over a radially inner side of the conductive winding in the respective slot in which the conductive winding is located, and the length of flexible material also blocks liquid communication from over the conductive winding at the radially inner side of the conductive winding at the first axial end of the respective slot.

Another aspect of the disclosure includes any of the preceding aspects, and the length of flexible material also extends over a radially inner side of the conductive winding in the respective slot in which the conductive winding is located.

Another aspect of the disclosure includes any of the preceding aspects, and the first resin dam includes a first resin dam extending around the conductive winding at the first axial end of each slot of the plurality of slots, and wherein the insulating resin is in each slot and around each first resin dam at the first axial end of each slot.

Another aspect of the disclosure includes any of the preceding aspects, and the first resin dams includes at least one length of flexible material wrapped around the conductive winding at the first axial end of at least one slot of the plurality of slots.

Another aspect of the disclosure includes any of the preceding aspects, and further comprising a second resin dam around the conductive winding at a second axial end of each slot opposite the first axial end, wherein the conductive winding extends out of the second axial end of each slot and the second resin dam blocks liquid communication through at least a space between the conductive winding and the inner surface of each slot at the second axial end of each slot.

Another aspect of the disclosure includes any of the preceding aspects, and the first resin dam and the second resin dam include a length of flexible material wrapped around the conductive winding at the first axial end of each slot and at the second axial end of each slot.

Another aspect of the disclosure includes any of the preceding aspects, and the first resin dam includes a dam member extending radially from the conductive winding at a location configured to abut the first axial end of the slot.

Another aspect of the disclosure includes any of the preceding aspects, and the conductive winding includes a conductive core and an insulative covering over the conductive core, and the dam member includes a flexible material extending at least partially under the insulative covering of the conductive winding.

Another aspect of the disclosure includes any of the preceding aspects, and the first resin dam includes a fastener configured to couple the dam member to an exterior surface of the conductive winding.

An aspect of the disclosure includes a method, comprising: forming a first resin dam around a conductive winding at a first axial end of a slot in an electric component of an electric machine, the conductive winding extending out of the first axial end of the slot; applying a liquid resin to the conductive winding and the slot, the first resin dam blocking liquid communication of the liquid resin through a space between the conductive winding and an inner surface of the slot at the first axial end of the slot; and curing the liquid resin resulting in an insulating resin in the slot, around the conductive winding and against the first resin dam at the first axial end of the slot.

Another aspect of the disclosure includes any of the preceding aspects, and forming the first resin dam includes wrapping a first length of flexible material around the conductive winding at the first axial end of the slot.

Another aspect of the disclosure includes any of the preceding aspects, and further comprising positioning a second length of the flexible material between the conductive winding and a bottom of the slot, wherein the first length and the second length are coextensive.

Another aspect of the disclosure includes any of the preceding aspects, and further comprising positioning a third length of the flexible material over the conductive winding in a radially open end of one of: the slot or another slot in the electric component adjacent to the slot, wherein the first length, the second length and the third length are coextensive.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
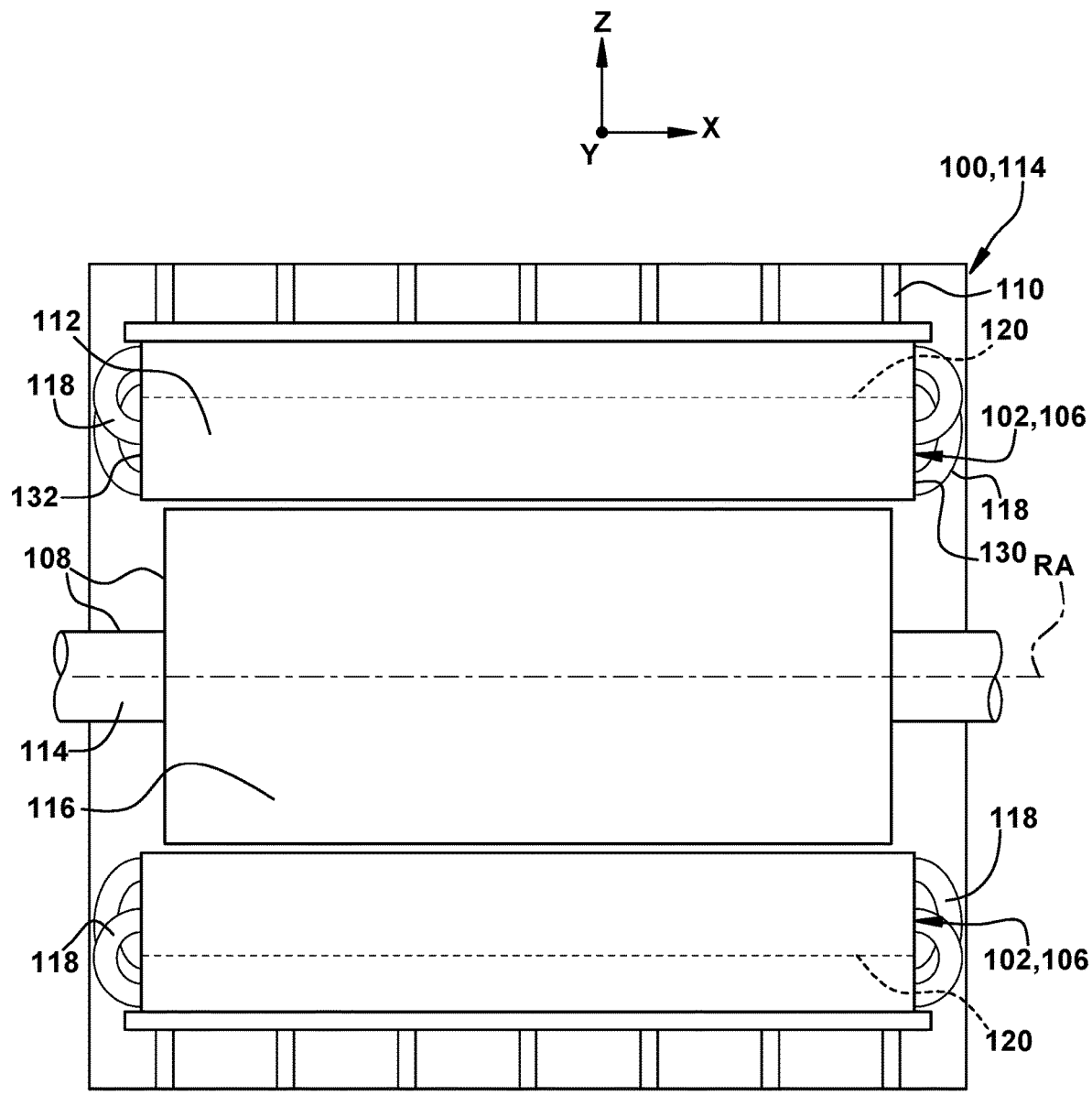
FIG. 1 shows a simplified cross-sectional side view of an electric machine including an electric component, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of an electric machine such as an electric generator or electric motor. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. It is often required to describe parts that are at different radial positions with regard to a center axis. The term "axial" refers to movement or position parallel to an axis, e.g., an axis of an electric machine such as a generator or motor. The term "radial" refers to movement or position perpendicular to an axis, e.g., an axis of conductive winding or an axis of the electric machine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around or across an axis, e.g., a circumferential interior surface of a body of a stator of a generator or motor. As indicated above, it will be appreciated that such terms may be applied in relation to the axis of the electric machine.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs or the feature is present and instances where the event does not occur or the feature is not present.

Where an element or layer is referred to as being "on," "engaged to," "disengaged from," "connected to" or "coupled to" or "mounted to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides an electric component for an electric machine. The electric component includes a body having a slot defined therein, and a conductive winding extending out of at least one axial end of the slot. Typically, the body includes a magnetic material having a plurality of slots formed therein, each slot configured to position a conductive winding therein. The electric component may include any electric machine component having conductive windings, such as but not limited to: a stator for a motor or an electric generator, or certain rotors for an electric motor. The electric component includes a resin dam around the conductive winding at axial end of the slot. The resin dams block liquid communication through at least a space between the conductive winding and an inner surface of the slots at the axial end(s) of the slots, during manufacture. For example, the resin dams may block liquid insulating resin leakage from the slots during or after a VPI process to impregnate the conductive windings and the slots with the liquid insulating resin. The resin dams may also block the leakage during a subsequent resin curing process. Any number of conductive windings in respective slots in electric component may include a resin dam applied thereto, e.g., one, some or all. The electric component also includes a (solidified) insulating resin in the slots and against the resin dams at the axial end(s) of the slots. Hence, the resin dams are part of the final electric component. The resin dams retain the liquid insulating resin around the conductive windings and in the slot during and after the VPI process. In addition, the resin dams retain the liquid insulating resin during the thermal curing process despite the high temperatures that lower the viscosity of the liquid insulating resin, and the possible rotation of the electric component. Consequently, the resin dams ensure complete filling of the slots and encapsulation of the conductive windings therein. Further, the resin dams prevent creation of thinly insulated areas and/or voids in the insulating resin around parts of the conductive winding, ensuring good performance of the electric machine.

FIG. 1 shows a schematic view of an electric machine 100 including an electric component 102, according to embodiments of the disclosure. For purposes of description only, electric machine 100 may include an electric generator 104 including a stator 106 and a rotor 108. In this example, electric component 102 may include stator 106. Stator 106 may also include a stator frame 110, and as will be further described, a body 112 that may include a conductive winding 118 about a magnetic core. Rotor 108 of electric machine 100 may further include a shaft 114 having a rotational axis RA. Stator 106 is disposed around rotor 108. Shaft 114 may be driven to rotate about a rotational axis by, for example, a gas turbine, a steam turbine, a wind turbine, a hydro turbine, an internal combustion engine, or any other suitable device configured to provide a rotational output. Shaft 114 is coupled to a substantially cylindrical body 116 (note, rotor 108 could alternatively include a conductive winding about a magnetic core). Rotor 108 is disposed within stator 106, which is configured to provide a stationary magnetic field. As appreciated, rotation of rotor 108 within stator 106 may generate electrical current within the conductive winding, thereby producing an electrical output from generator 104.

Figure 2:
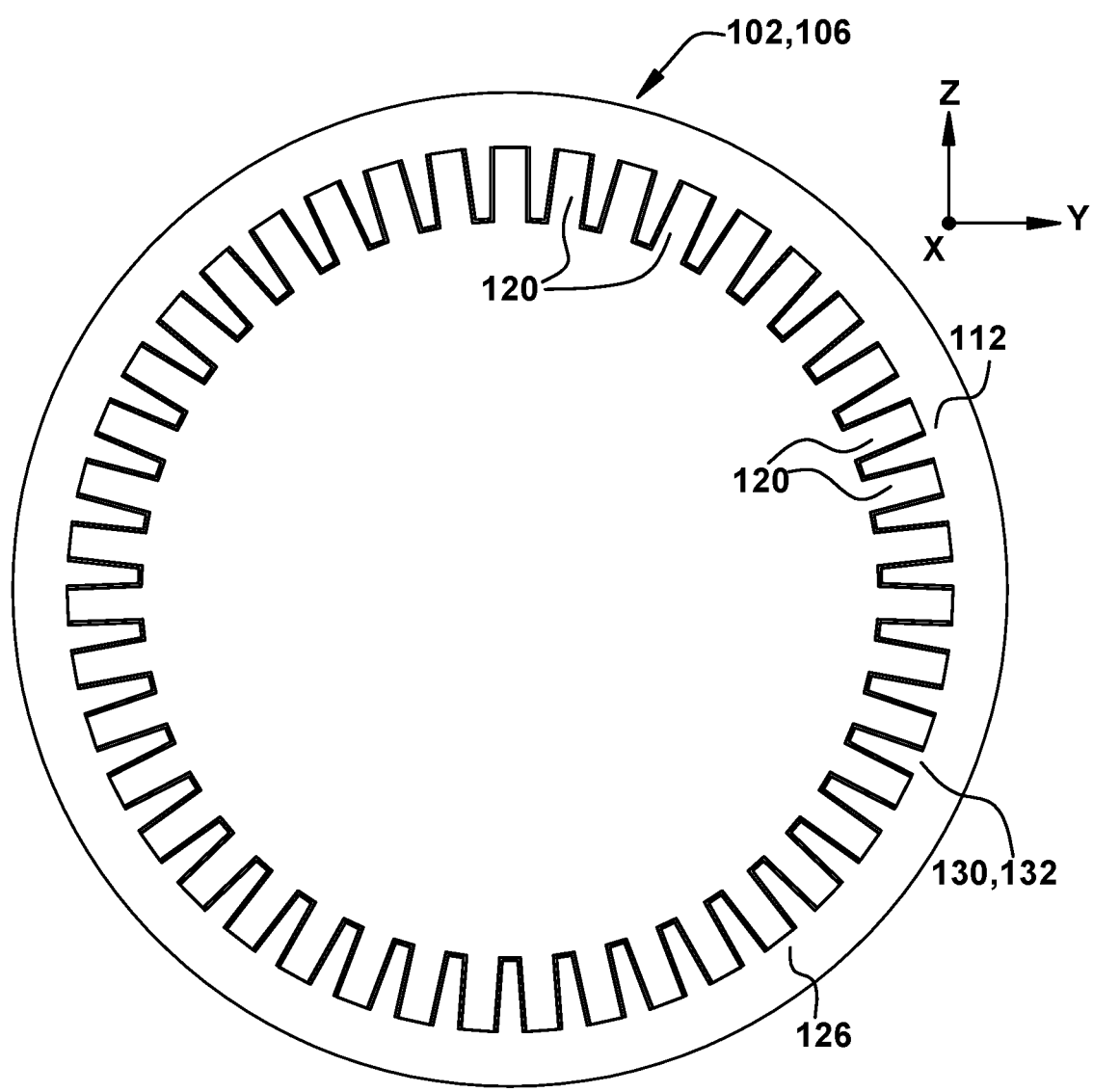
FIG. 2 shows a simplified end view of an electric component without conductive windings therein, according to embodiments of the disclosure.
Figure 3:
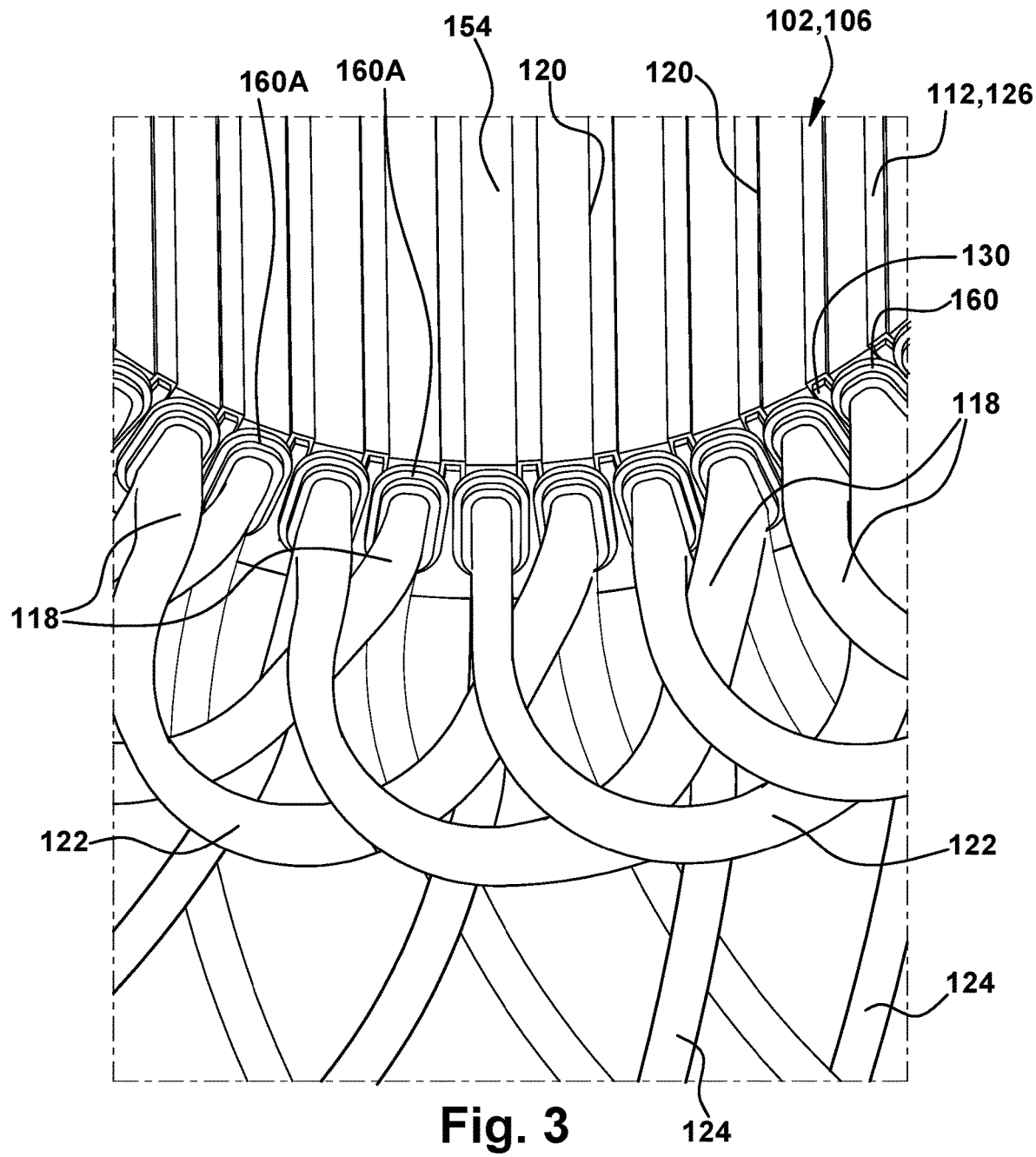
FIG. 3 shows an end view of an electric component including conductive windings and resin dams, according to embodiments of the disclosure.

FIG. 2 shows an axial end view of electric component 102, e.g., stator 106 of generator 104 without conductive windings 118 (FIG. 1) or rotor 108 therein, and FIG. 3 shows an axial end view of electric component 102, e.g., stator 106 of generator 104, with conductive windings 118 therein but with rotor 108 removed. Electric component 102 for electric machine 100 may include body 112 having a plurality of slots 120 defined therein. That is, electric component 102 includes a plurality of slots 120 defined in body 112 thereof. Each slot 120 extends radially and axially relative to the axis RA (FIG. 1) of electric machine 100. Depending, for example, on the size of electric machine 100, any number of slots 120 may be provided to position any number of conductive windings 118 in slots 120. As shown in FIG. 3, certain conductive windings 118 include U-turns 122 therein to re-route conductive winding 118 back into body 112, while other conductive windings 124 extend axially away from body 112 for connection to other structure. In this manner, various conductive windings 118 loop back-and-forth through electric component 102 in a known fashion. Body 112 provides a magnetic core 126 for electric component 102 and may include any now known or later developed magnetic material appropriate for electric machine 100. Body 112 and slots 120 therein may be made in any manner, e.g., machine slots in a tubular element, stacked slotted plates, among other arrangements.

Figure 4:
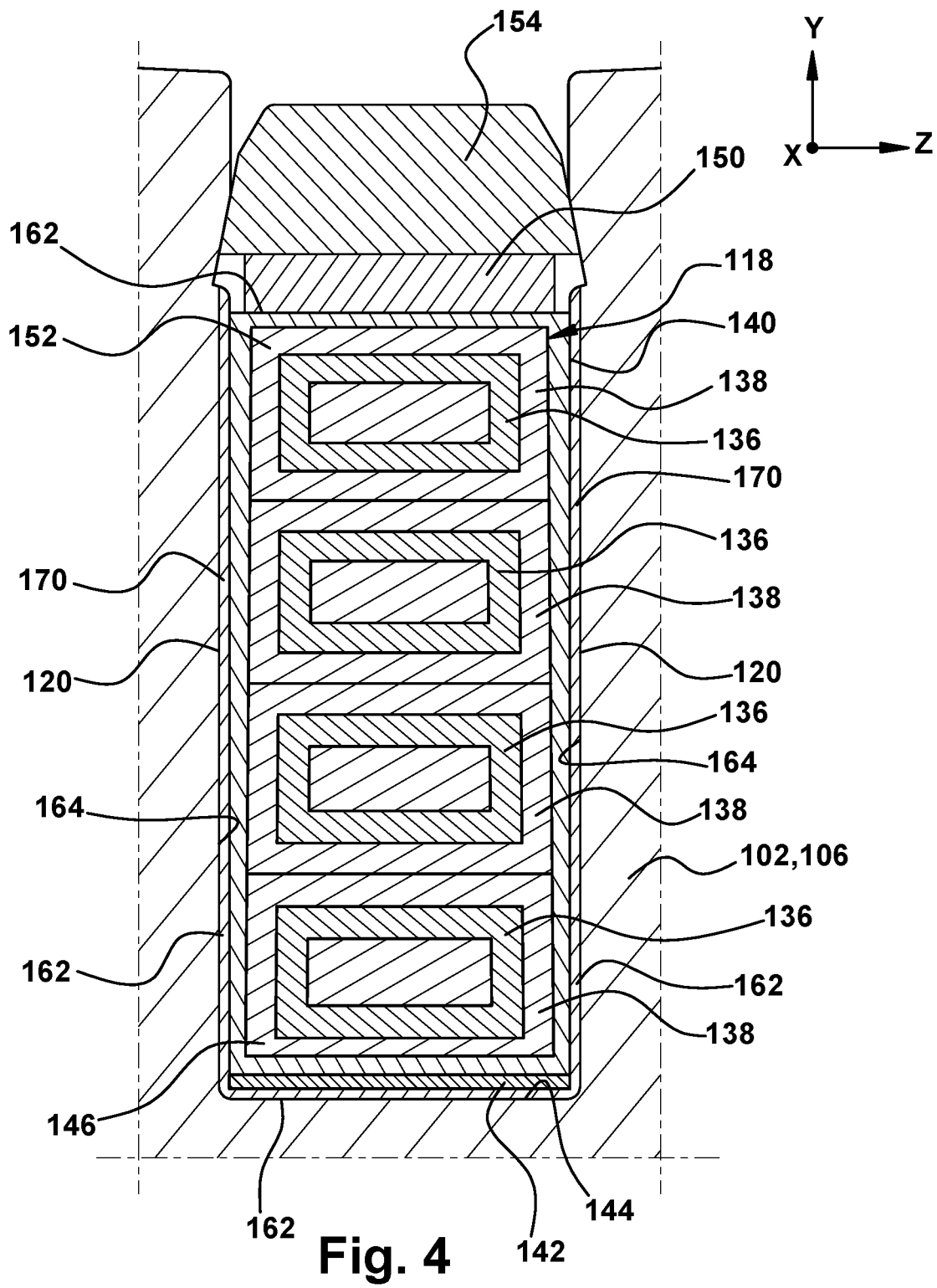
FIG. 4 shows an axial cross-sectional view through an illustrative conductive winding in a slot in an electric component without a resin dam thereon, according to embodiments of the disclosure.

As shown in FIG. 3, electric component 102 includes a conductive winding 118 in each slot 120. Conductive windings 118 extend out of a first axial end 130 of slots 120. As shown in FIG. 1, body 112 and slots 120 also include a second axial end 132 opposing first axial end 130. Conductive windings 118 also extend out of second axial end 132 of slots 120. Conductive windings 118 may include any form of electrically conductive winding (also referred to as coils) used in electric machines. FIG. 4 shows an axial cross-sectional view through an illustrative conductive winding 118 in slot 120, without a resin dam thereon. Conductive windings 118 may include, for example, a number of conductive members 136, each insulated from each other with an insulative tape 138, e.g., mica tape and other insulating layers. Each conductive member 136 may include conductive material in a variety of forms such as but not limit to: hollow (shown), solid, stranded or a mix of different types of conductive materials. A ground wall insulation layer 140 may surround conductive members 136 and insulative tape 138. FIG. 4 also shows a length of flexible material 142 extending between conductive winding 118 and a bottom 144 of slot 120, i.e., under a radially outer side 146 of conductive winding 118. A length of flexible material layer 150 may also, optionally, extend over a radially inner side 152 of conductive winding 118 in slot 120. Lengths 142, 150 of flexible material may include any material capable of absorbing shock and/or vibration to reduce damage to conductive windings 118 in slots 120 during operation of an electric machine. In certain embodiment, lengths 142, 150 of flexible material may include a porous fabric such as a felt, e.g., a nonwoven fabric of fibers matted together. The flexible material can be made of any organic or inorganic material capable of withstanding the working environment of electric machine 100, and/or the creation of resin dams 160 as will be described herein. Lengths 142, 150 also include interstitial spaces therein for receiving insulating resin 170, as described herein. A retainer element 154 may be positioned over conductive winding 118 in slot 120. Retainer element 154 may include any now known or later developed mechanism to physically retain conductive winding 118 in slot 120.

As shown in FIGS. 3 and 5-8, electric component 102 includes a resin dam 160 around conductive winding 118 at axial ends 130 and/or 132 of slot 120, respectively. FIG. 5-8 show circumferential cross-sectional views of body 112 of electric component 102 including resin dam 160, according to various embodiments of the disclosure. Resin dams at either axial end 130, 132 are labeled as 160 (see e.g., FIGS. 5-7), resin dams at first axial end 130 of slots 120 are labeled 160A (see e.g., FIGS. 3 and 8), and resin dams at second axial end 132 of slots 120 are labeled 160B (see e.g., FIG. 8). Resin dams 160 block liquid communication through at least a space 162, however small, between conductive winding 118 and an inner surface 164 of slot 120 at axial end 130, 132 of slot 120. As will be further described, electric component 102 also includes a (cured, solidified) insulating resin 170 in slot 120 and against resin dams 160 at axial end(s) 130, 132 of slot 120. It is noted that insulating resin 170 is shown in an enlarged manner in FIG. 4 for clarity of illustration only—conductive winding 118 is tight to inner surface 164 of slot 120. Insulating resin 170 is embedded in lengths 142, 150 of flexible material and resin dam 160 (shown as dark black line in cross-section of FIG. 5, but otherwise shaded in other cross-sectional drawings).

Resin dams 160 may be applied to axial end 130, 132 of any number of slots 120, e.g., one, some or all slots 120. Application of resin dams 160 may be user defined based on, for example, where leakage of liquid insulating resin from a slot 120 is a concern during manufacture.

Resin dams 160 can take a number of forms according to embodiments of the disclosure.

In certain embodiments, resin dam 160 can include a length or lengths 182 of flexible material. Length 182 of flexible material used to form resin dam(s) 160 may be separate from or coextensive with length 142 of flexible material extending between conductive winding 118 and bottom 144 of slot 120 (i.e., under a radially outer side 146 of conductive winding 118). In addition thereto or alternatively, length 182 of flexible material used to form resin dam(s) 160 may be separate from or coextensive with length 150 of flexible material extending over radially inner side 152 of conductive winding 118 in slot 120. Lengths 142, 150, 180 of flexible material may have any width necessary for its function, e.g., shock/vibration absorption in slot 120 and/or formation of resin dam 160. Lengths 142, 150, 180 of flexible material may change dimensions over their lengths, e.g., where one coextensive strip of flexible material, lengths 142, 150 within a slot 120 may be thinner in width and/or height than length 182 for resin dam 160.

Figure 5:
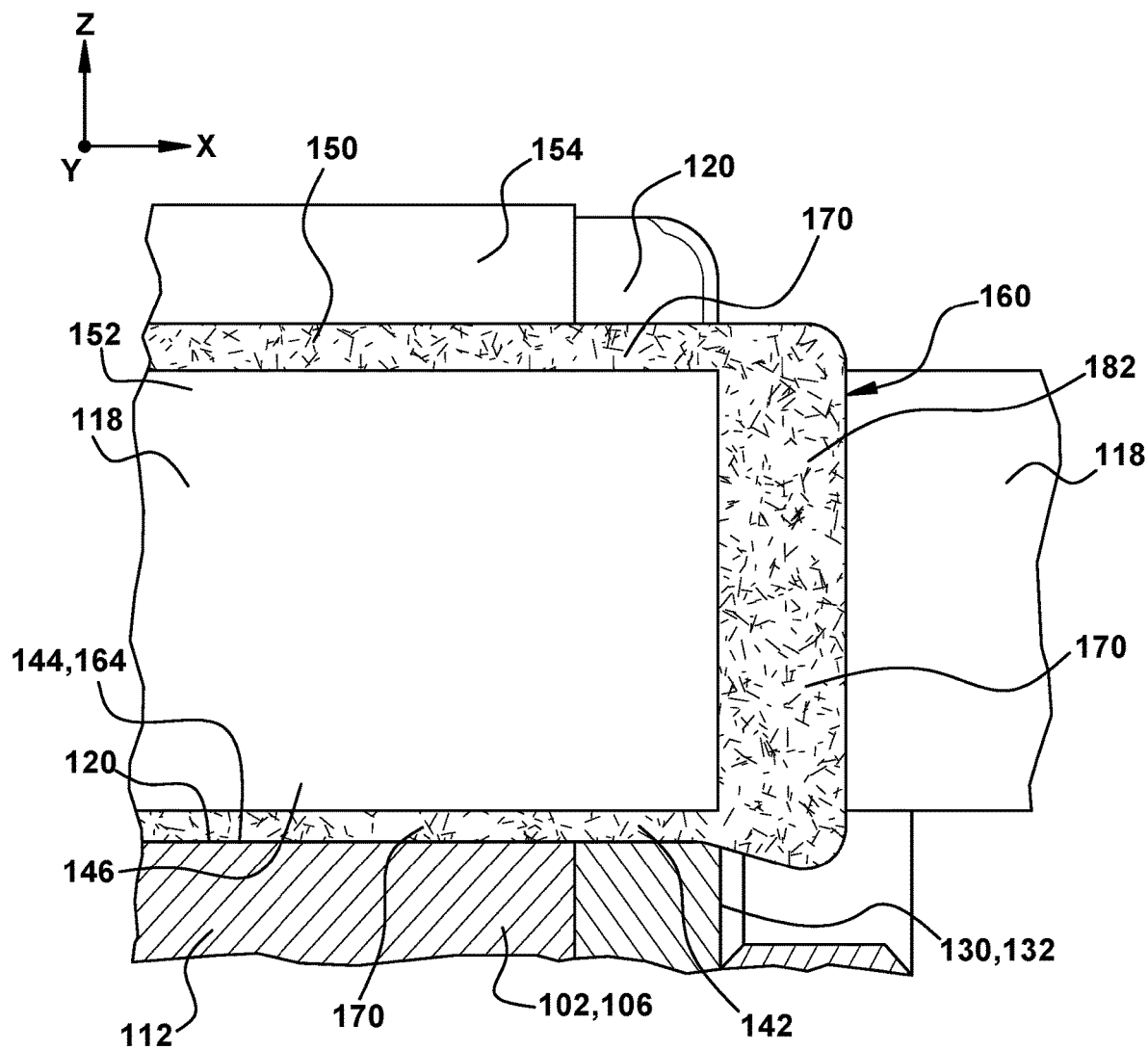
FIG. 5 shows a circumferential cross-sectional view of an axial end of a body of an electric component including a resin dam, according to embodiments of the disclosure.
Figure 6:
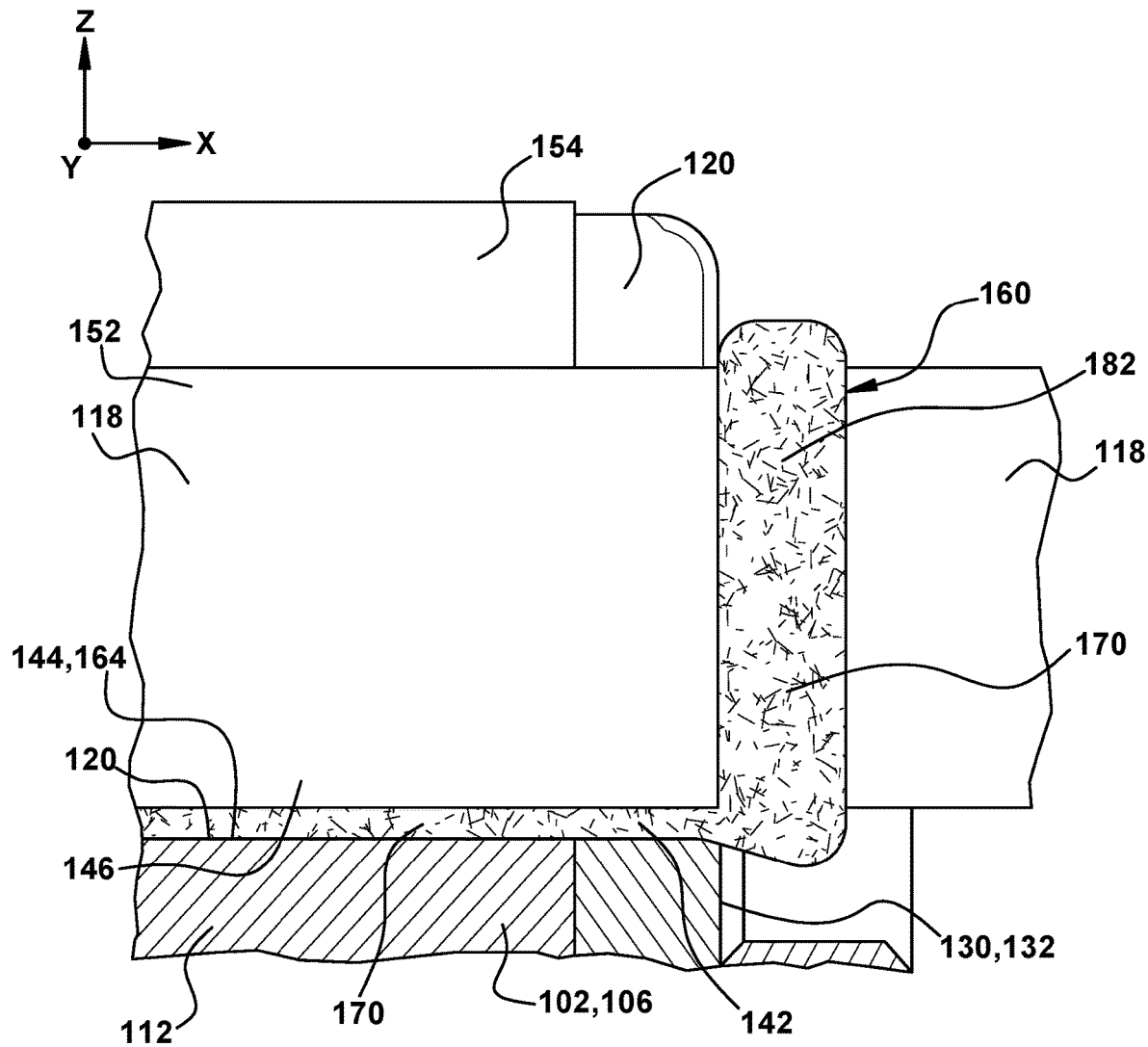
FIG. 6 shows a circumferential cross-sectional view of an axial end of a body of an electric component including a resin dam, according to other embodiments of the disclosure.
Figure 7:
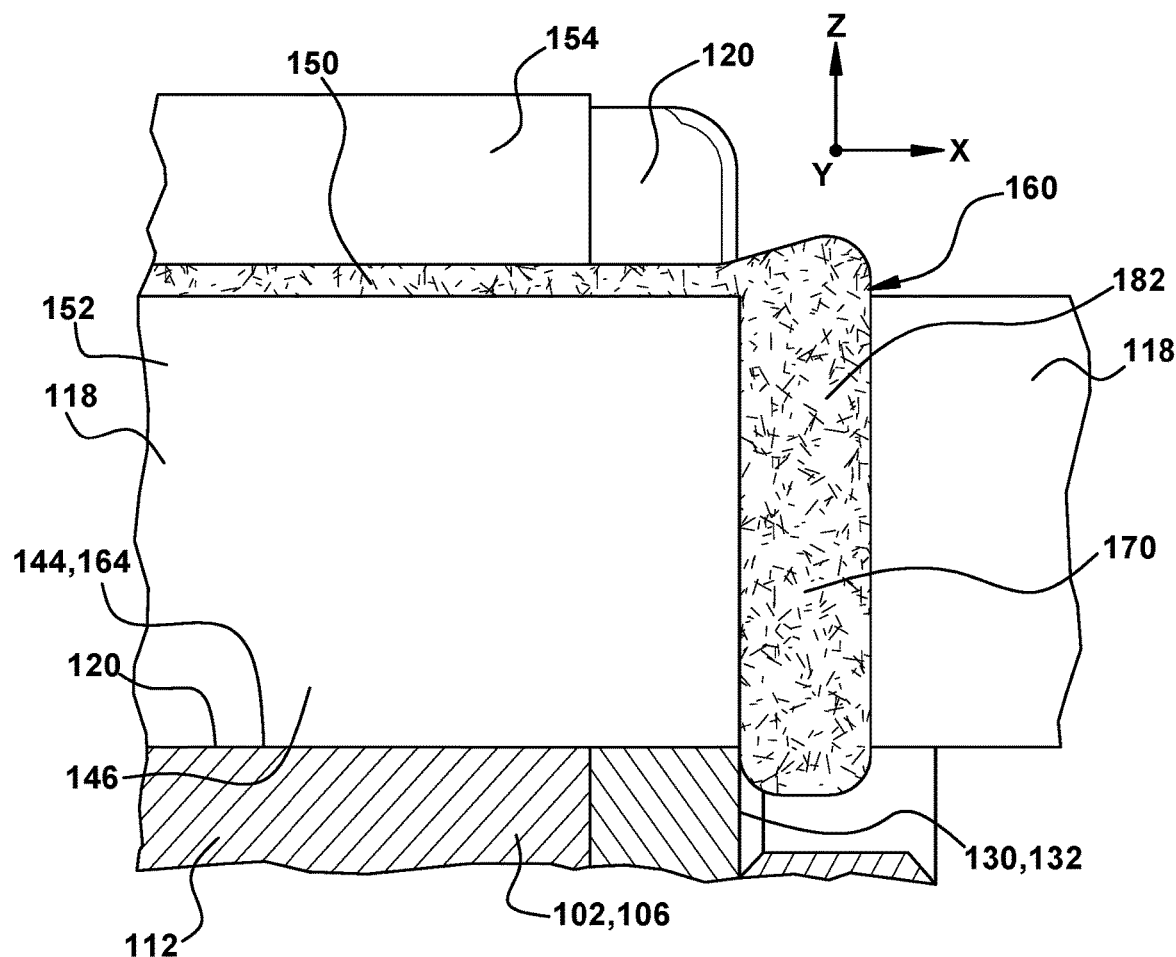
FIG. 7 shows a circumferential cross-sectional view of an axial end of a body of an electric component including a resin dam, according to other embodiments of the disclosure.
Figure 8:
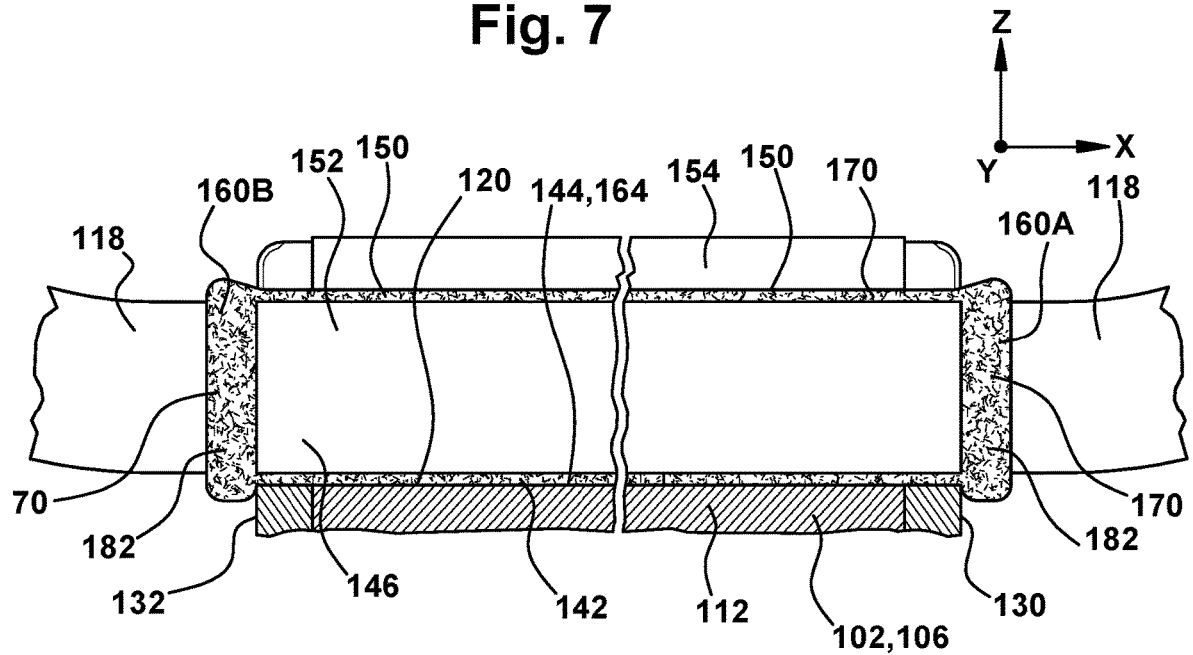
FIG. 8 shows a circumferential cross-sectional view of a body of an electric component including resin dams at both axial ends thereof, according to embodiments of the disclosure.
Figure 12:
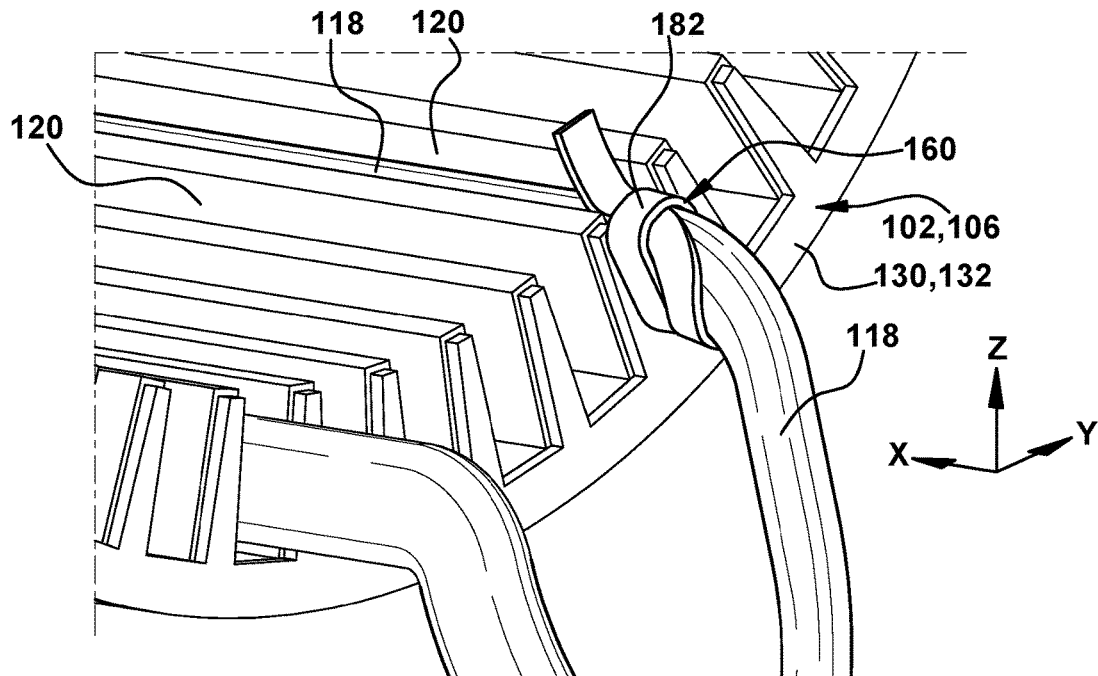
FIG. 12 shows a perspective view of a resin dam in which a conductive winding has a single length of flexible material thereon that does not extend within a slot, according to embodiments of the disclosure.

In FIG. 5, a single, coextensive length of flexible material extends between conductive winding 118 and bottom 144 of slot 120 (length 142), over radially inner side 152 of conductive winding 118 in slot 120 (length 150) and is wrapped around conductive winding 118 at axial end 130, 132 of slot 120 (wrapped length 182 of flexible material). In the circumferential cross-sectional view of FIG. 6, a single, coextensive length of flexible material 180 extends between conductive winding 118 and bottom 144 of slot 120 (length 142) and is wrapped around conductive winding 118 at axial end 130, 132 of slot 120 (wrapped length 182 of flexible material). In the circumferential cross-sectional view of FIG. 7, a single, coextensive length of flexible material 180 extends over radially inner side 152 of conductive winding 118 in slot 120 (length 150) and is wrapped around conductive winding 118 at axial end 130, 132 of slot 120 (wrapped length 182 of flexible material). FIG. 12, described elsewhere herein, shows a single length 182 of flexible material for only a resin dam 160.

Where provided, lengths 142, 150 of flexible material may extend any distance along slot 120. Where lengths 142, 150 are provided extending from each axial end 130, 132, the ends thereof in slot 120 may not meet within slot 120, i.e., there may be insulating resin 170 between the ends. Alternatively, the ends of lengths 142 and/or 150 extending from opposing axial ends 130, 132 may be butted together or overlapped within slot 120. As shown in the cross-sectional view of FIG. 8, in certain embodiments, a single length of flexible material may provide lengths 142, 150 and wrapped lengths 182 at both axial ends 130, 132. For example, moving counter-clockwise from bottom 144 of slot 120, the length of flexible material may extend as length 142 in slot 120 at first axial end 130 of slot 120, form a first resin dam 160A at first axial end 130 of slot 120 (wrapping around conductive winding 118 at first axial end 130), extend as length 150 from first axial end 130 to second axial end 132 of slot 120, form a second resin dam 160B at second axial end 132 (wrapping around conductive winding 118 at second axial end 132), and extend as length 142 in slot 120 at second axial end 132 of slot 120.

Figure 9A:
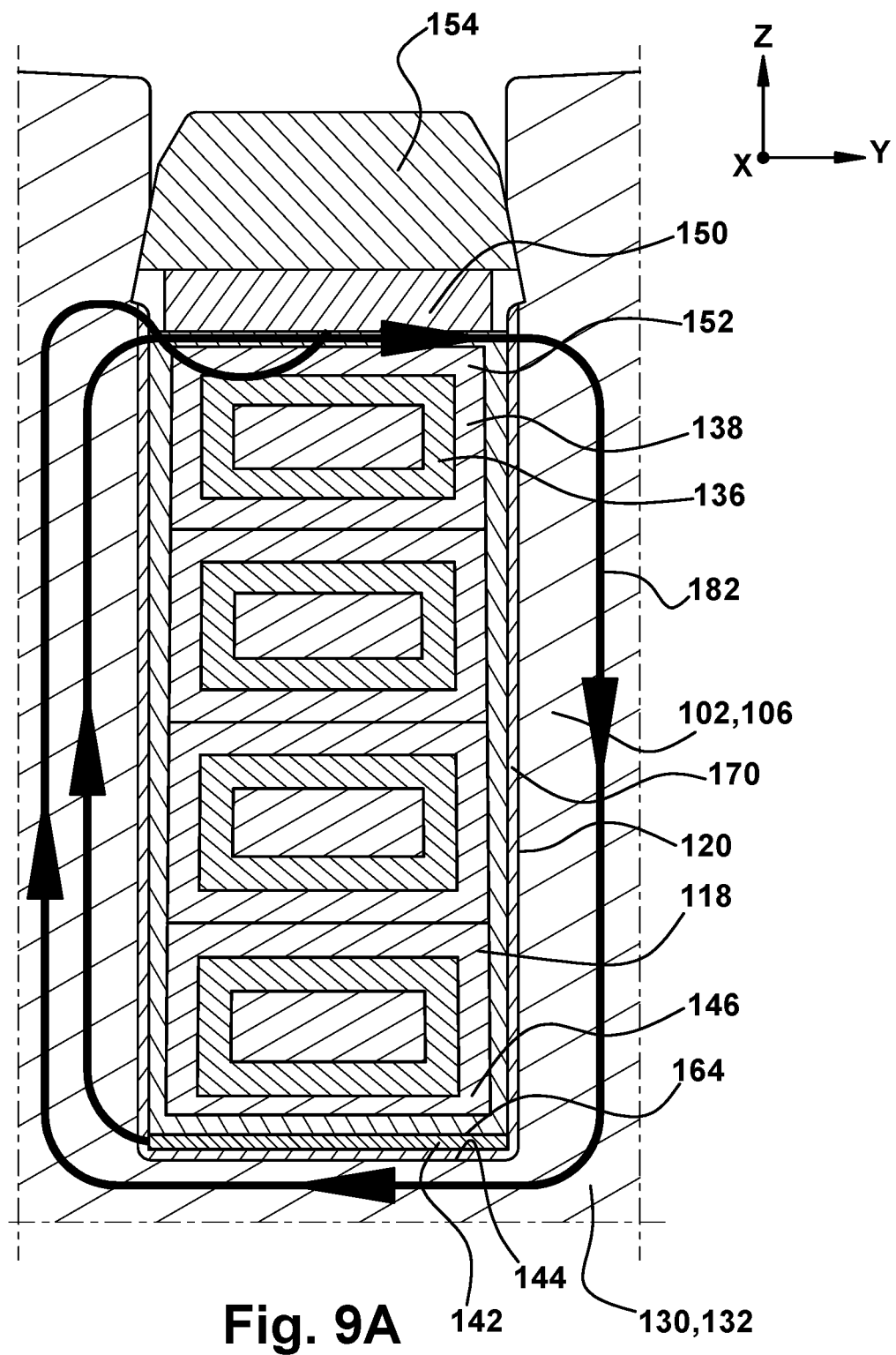
FIG. 9A shows a schematic view of a length of flexible material, as a dark, thick line, wrapped around a conductive winding as in FIG. 5.
Figure 9B:
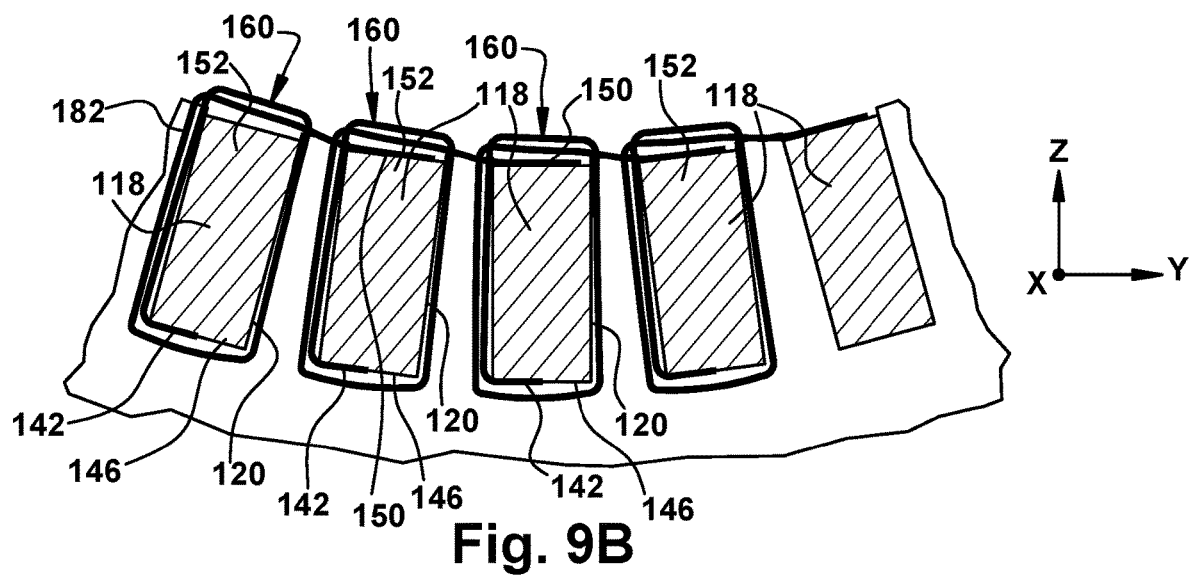
FIG. 9B shows a schematic view of a length of flexible material, as a dark, thick line, wrapped around a conductive winding, according to another embodiment.

Length 182 of flexible material can wrap around conductive winding 118 in any manner sufficient to form resin dam 160. That is, length 182 can wrap in any manner desired to reduce or prevent leakage of liquid insulating resin from space 162 between conductive winding 118 and inner surface 164 of slot 120. FIG. 9A shows a schematic view of length 182 of flexible material (as a dark, thick line) wrapped around conductive winding 118 as in FIG. 5. In this non-limiting example, the length of flexible material extends from under conductive winding 118 in bottom 144 of slot 120 (length 142, out of page), then as length 182 for resin dam 160, extends radially inward (of electric component 102) along conductive winding 118, passes circumferentially over radially inner side 152 (outside of slot) of conductive winding 118, then radially outward along conductive winding 118, under conductive winding 118 (as shown), again radially inward, and then tucks under itself before entering over radially inner side 152 of conductive winding 118 in slot 120 (into page of FIG. 9A) as length 150. FIG. 9B shows a schematic view of a length of flexible material (as a dark, thick line) wrapped around conductive winding 118, according to another embodiment. In this non-limiting example, the length of flexible material extends from under conductive winding 118 in bottom 144 of a given slot 120 (length 142, out of page), then as length 182 extends radially inward (of electric component 102) along conductive winding 118, passes circumferentially over radially inner side 152 (outside of the given slot) of conductive winding 118, then radially outward along conductive winding 118, under conductive winding 118 (as shown), and again radially inward. At this position, length 182 may tuck under itself. Thereafter, the flexible material may extend (to the right on page of FIG. 9B) as length 150 over radially inner side 152 of conductive winding 118 in another slot 120 (to the right as shown) adjacent to the given slot 120 in which length 142 is positioned (into page of FIG. 9B). Hence, parts of the lengths 142, 150, 182 of flexible material can be used for a resin dam 160 and in more than one slot 120. With regard to FIGS. 9A-B, it is emphasized that the lengths of flexible material are shown loose for purposes of illustration—the lengths would be made taught to form resin dams 160.

Length 182 of flexible material can have any level of tautness to ensure resin dam 160 functions properly and remains in location during manufacture. Length 182 of flexible material can be positioned and fixed in place to abut axial end 130, 132 and space 162 between conductive winding 118 and slot 120 in any manner to ensure resin dam 160 functions properly and remains in location during manufacture.

Figure 10:
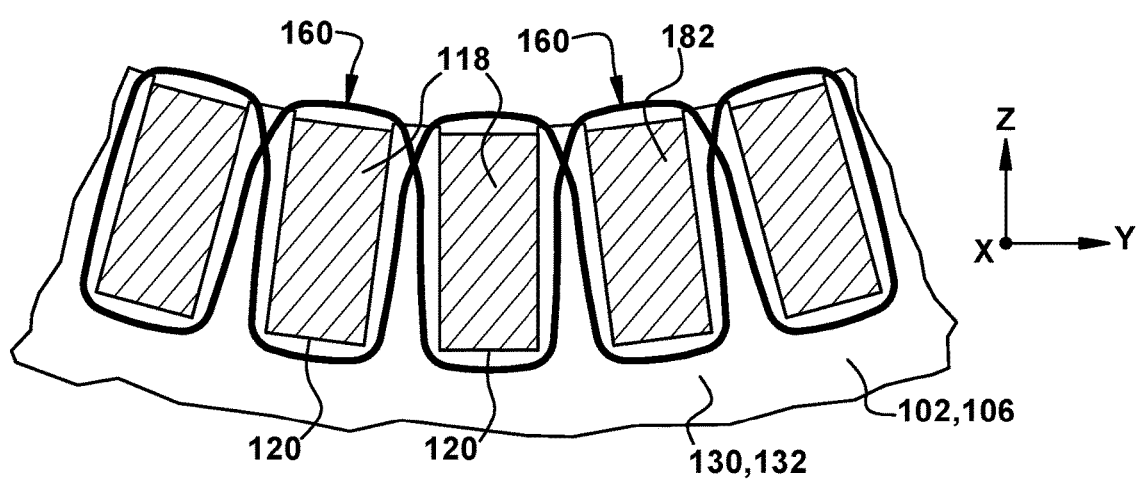
FIG. 10 shows a schematic end view of an electric component with a resin dam including a single length of flexible material, as a dark, thick line, that does not extend within a slot, according to embodiments of the disclosure.
Figure 11:
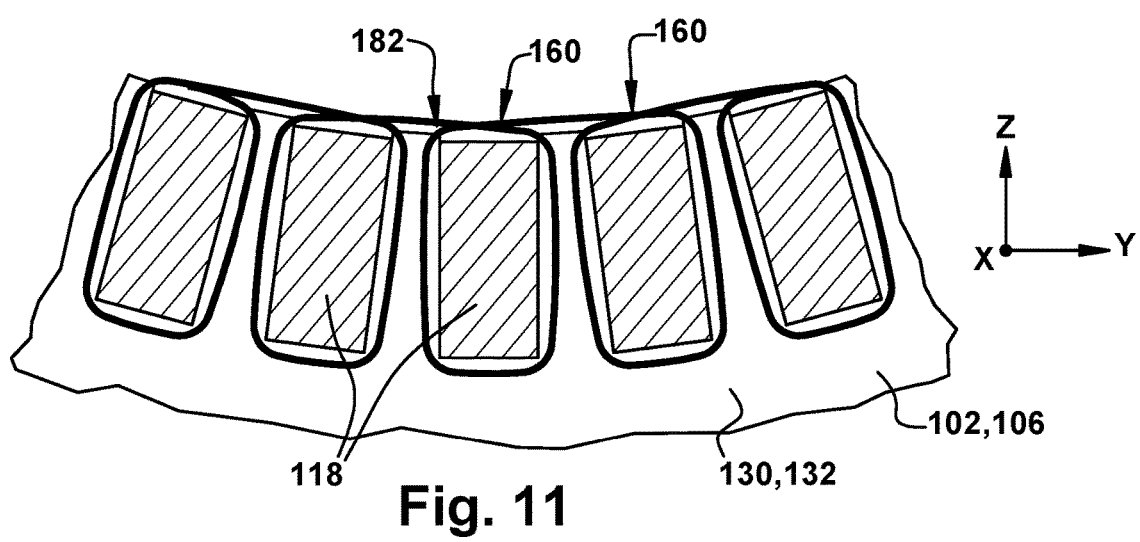
FIG. 11 shows a schematic end view of an electric component with a resin dam including a single length of flexible material that does not extend within a slot, according to embodiments of the disclosure.

FIGS. 10 and 11 show schematic end views of electric component 102 in which a single length 182 of flexible material for resin dams 160 does not extend within slot 120. Rather, length 182 of flexible material extends in any manner desired around any number of conductive windings 118 in any number of slots 120 to form resin dams 160 at a given axial end 130 or 132 of the slots 120. That is, length of flexible material 180 may wrap around any number of conductive windings 118 extending from any number of slots 120 to form any number of resin dams 160. Length 182 of flexible material 180 can be any length. In this manner, one, some or all conductive windings 118 exiting slots 120 of a given axial end 130, 132 of electric component 102 can include a resin dam 160. Length 182 of flexible material can take any path about conductive windings 118, e.g., sinusoidal (FIG. 10) or individual wrap (FIG. 11).

FIG. 12 shows a perspective view of an embodiment of resin dam 160 in which each conductive winding 118 has its own single length 182 of flexible material thereon that does not extend within slot 120. Here, a length 182 of flexible material may be only wrapped around a single conductive winding 118 at an axial end 130, 132 of slot 120. Hence, each conductive winding 118 includes its own respective length 182 of flexible material forming a resin dam 160 therefor. While one resin dam 160 of this arrangement is shown in FIG. 12, one, some or all conductive windings 118 to be provided in slots 120 can be so arranged. Each length 128 can be wrapped in any manner necessary to ensure it stays in place, e.g., it can be wrapped similar to that shown in FIG. 9.

As shown in FIGS. 3 and 5, length 182 of flexible material wrapped around conductive winding 118 at axial ends 130 and/or 132 creates a resin dam 160 extending radially from conductive winding 118 and against axial end 130, 132 of slot 120 to physically cover any space 162 between conductive winding 118 and slot 120. In this manner, resin dam 160 blocks any leakage of liquid resin from slot 120. In addition, lengths 142, 150, 182 of flexible material may include a fabric or other flexible material including interstitial spaces therein such that insulating resin 170 is embedded in the interstitial spaces of the fabric or other material. As a result, after curing, there are fewer thin areas and/or voids of insulating resin 170 around conductive winding 118 in slot 120, which improves performance of electric machine 100. In a final electric machine 100, insulating resin 170 may also be embedded in and/or surround resin dam 160.

In any of the afore-described embodiments, as shown for example in FIGS. 3 and 5, length 182 of flexible material is wrapped around conductive winding 118 at axial ends 130 and/or 132 to create resin dams 160 extending radially from conductive winding 118 and against axial end 130, 132 of slot 120 to physically cover any space 162 between conductive winding 118 and slot 120. In this manner, resin dam 160 blocks any leakage of liquid resin from slot 120. In addition, lengths 142, 150, 182 of flexible material may include a fabric or other flexible material including interstitial spaces therein such that insulating resin 170 is embedded in the interstitial spaces of the fabric or other material. As a result, after curing, there are fewer thin areas and/or voids of insulating resin 170 around conductive winding 118 in slot 120, which improves performance of electric machine 100. In a final electric machine 100, insulating resin 170 may also be embedded in and/or surround resin dam 160.

Figure 13:
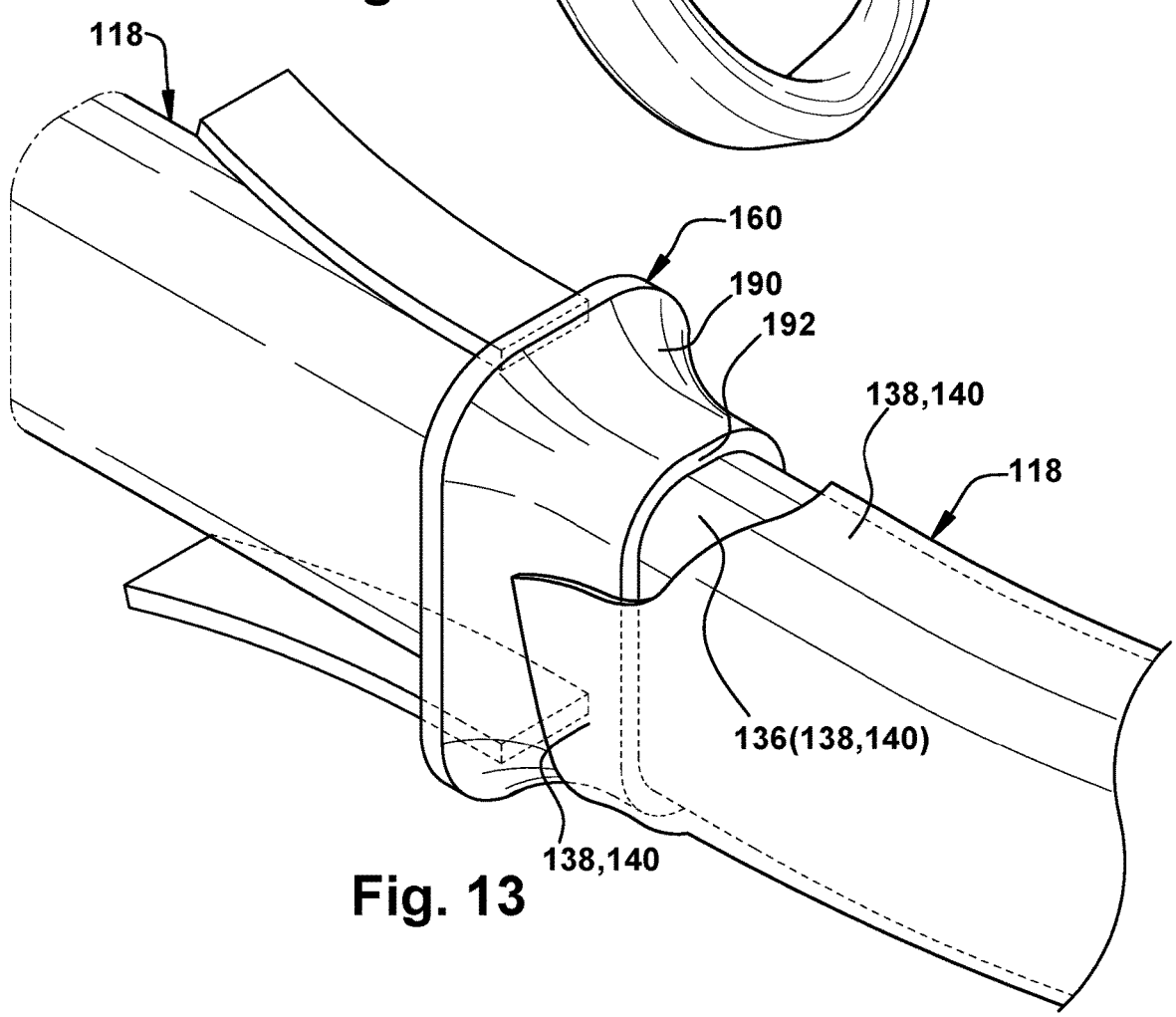
FIG. 13 shows a perspective view of a resin dam including a dam member coupled to a conductive winding, according to embodiments of the disclosure.
Figure 14:
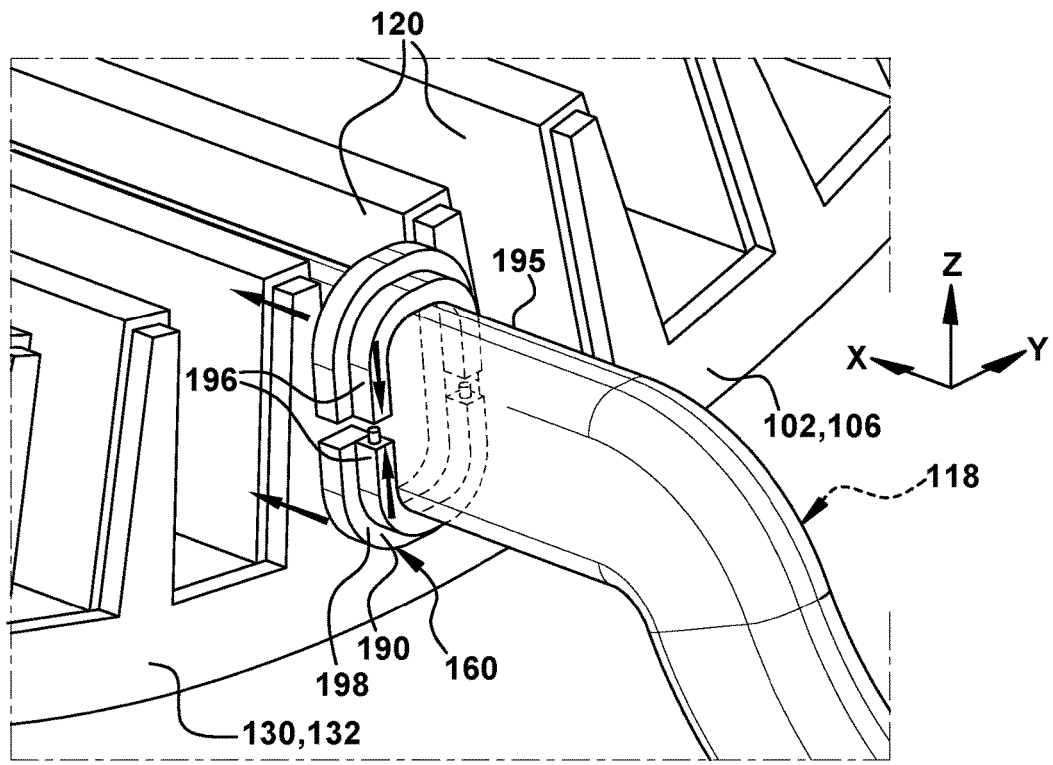
FIG. 14 shows a perspective view of a resin dam including a dam member coupled to a conductive winding using a fastener, according to other embodiments of the disclosure.

In other embodiments, resin dam 160 does not include length 182 of flexible material but may include a dam member 190 made of flexible or stiff material. FIGS. 13 and 14 show perspective views of embodiments in which resin dams 160 include dam members 190 coupled to conductive windings 118. Resin dams 160 in this form can be positioned along respective conductive windings 118 and against axial ends 130, 132 of slots 120 to block liquid communication through at least space 162 between conductive winding 118 and inner surface 164 of slot 120 at axial ends 130 and/or 132 of the slot. More particularly, in certain embodiments, resin dam 160 includes a dam member 190 extending radially from conductive winding 118 at a location configured to abut axial end 130 or 132 of slot 120. As noted, conductive winding 118 includes a conductive core (including, e.g., number of hollow conductive members 136) and an insulative covering (including, e.g., insulative tape 138 (mica tape and other insulating layers) and/or ground wall insulation layer 140) over the conductive core. In certain embodiments, as shown in FIG. 13, dam member 190 may include flexible material, as described herein, that extends partially under an insulative covering (e.g., tape 138 and/or insulation layer 140) of conductive winding 118. See portion 192 of dam member 190 positioned between the conductive core (members 136) (and perhaps some inner layers of insulative covering(s)), and outer layers of insulative covering(s). In this case, resin dam 160 may be formed as part of conductive windings 118 prior to installation in slots 120, and or may be added to conductive windings 118 as the insulative covering is positioned thereon after installation in slots 120.

In other embodiments, as shown in FIG. 14, resin dams 160 include a fastener 194 configured to couple dam member 190 to an exterior surface 195 of conductive winding 118. Here, resin dam 160 may be positioned on conductive windings 118 before or after installation thereof in slots 120. Fastener 196 may include any now known or later developed fastener appropriate for coupling to dam member 190. In the non-limiting example shown, dam member 190 includes an expandable C-shaped element 198 that can be placed over conductive winding 118 and closed by coupling of fastener 196. In this example, dam member 190 may include a flexible material that may be as flexible as the material described previously herein (e.g., felt), or it can be slightly stiffer (e.g., a soft plastic). In any event, fastener 196 may include any form of fastening mechanism, such as but not limited to C-shaped members with male/female connectors (shown), hook-and-loop fasteners, etc., to fix dam member 190 on exterior surface 195 of conductive winding 118 and against axial end 130, 132 of slot 120. That is, fastener 196 closes and fixes dam member 190 relative to conductive winding 118 and slot 120 in a radially extending manner from conductive winding 118. Resin dam 160 can be positioned against axial end 130, 132 of slot 120 prior to fastening to ensure blockage liquid resin.

As shown in FIG. 3, where electric component 102 includes a plurality of slots therein that require resin dams 160, one or a plurality resin dams 160A may be provided. In one embodiment, one first resin dam 160A may extend around conductive winding 118 at first axial end 130 of each slot 120 of the plurality of slots. Electric component 102 also includes insulating resin 170 in each slot 120 and around each first resin dam 160A at first axial end 130 of each slot 120. First resin dams 160A may take any form described herein. For example, first resin dams 160A may include at least one length 182 of flexible material wrapped around conductive winding 118 at first axial end 130 of at least one slot 120 of the plurality of slots. As shown best in FIG. 8, a second resin dam 160B may be around conductive winding 118 at a second axial end 132 of slot 120 opposite first axial end 130. Conductive winding 118 extends out of second axial end 132 of slot 120 and second resin dam 160B blocks liquid communication through at least space 162 between conductive winding 118 and inner surface 164 of slot 120 at second axial end 132 of the slot. Second resin dams 160B may take any form described herein. For example, second resin dams 160B may include at least one length 182 of flexible material wrapped around conductive winding 118 at second axial end 132 of at least one slot 120 of the plurality of slots. As described relative to FIG. 8, first resin dam 160A and second resin dam 160B may include a single length of flexible material 180 wrapped around conductive winding 118 at first axial end 130 of slot 120 and at second axial end 132 of the slot. Alternatively, each axial end 130, 132 may have its own respective resin dam 160, discontinuous with the resin dam at the opposing axial end.

Figure 15:
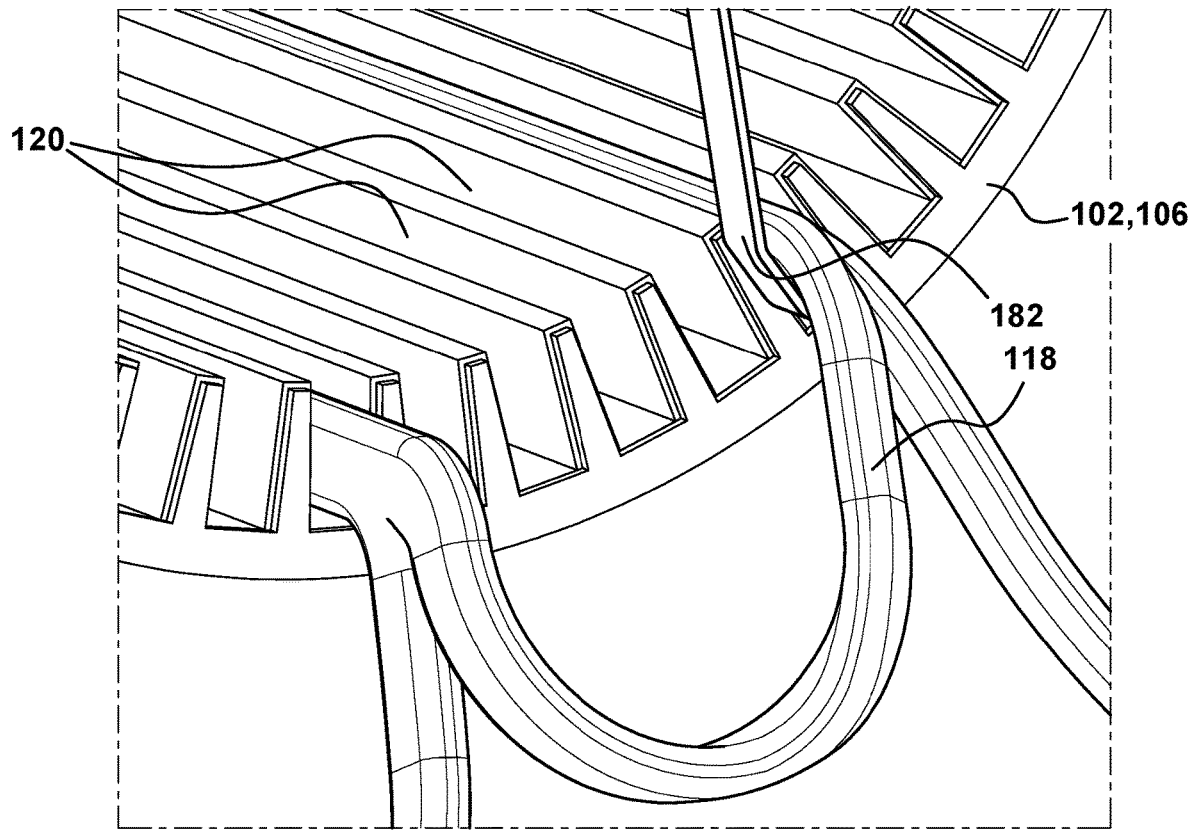
FIGS. 15-20 show perspective views of a method, according to embodiments of the disclosure.
Figure 16:
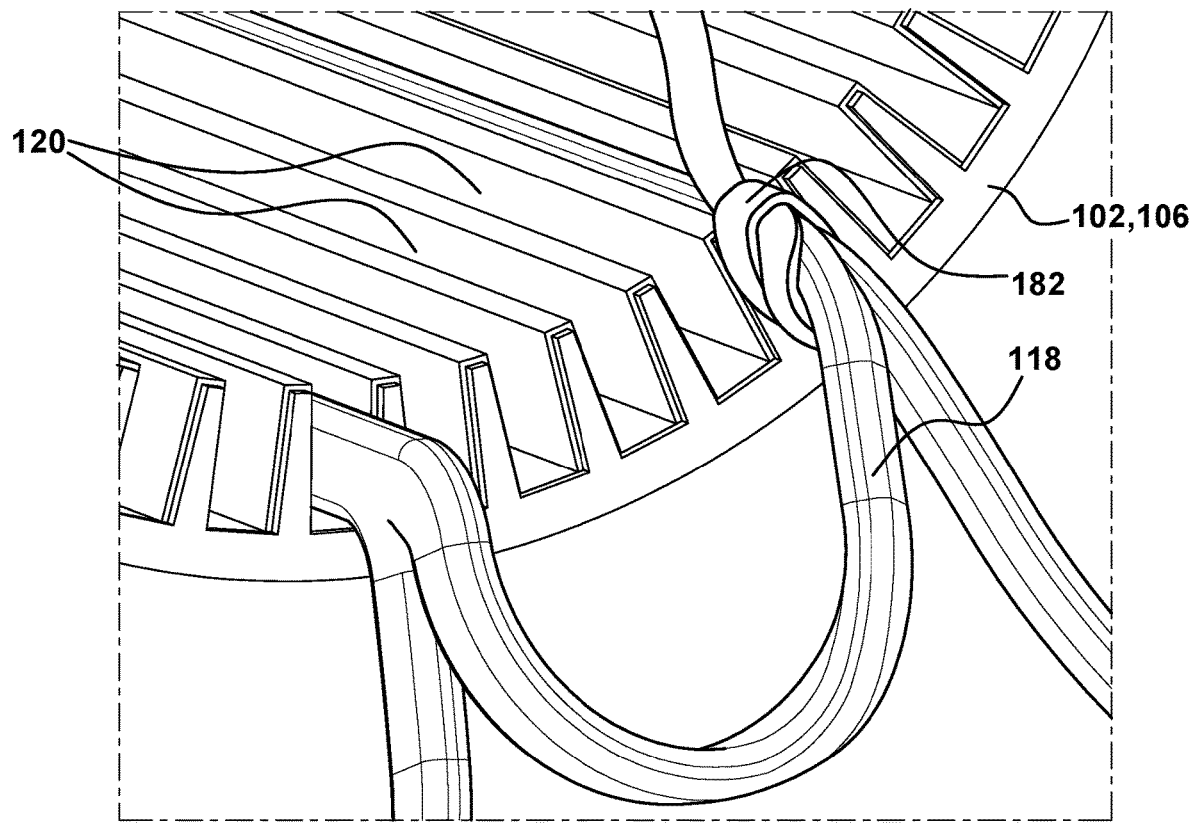
Figure 17:
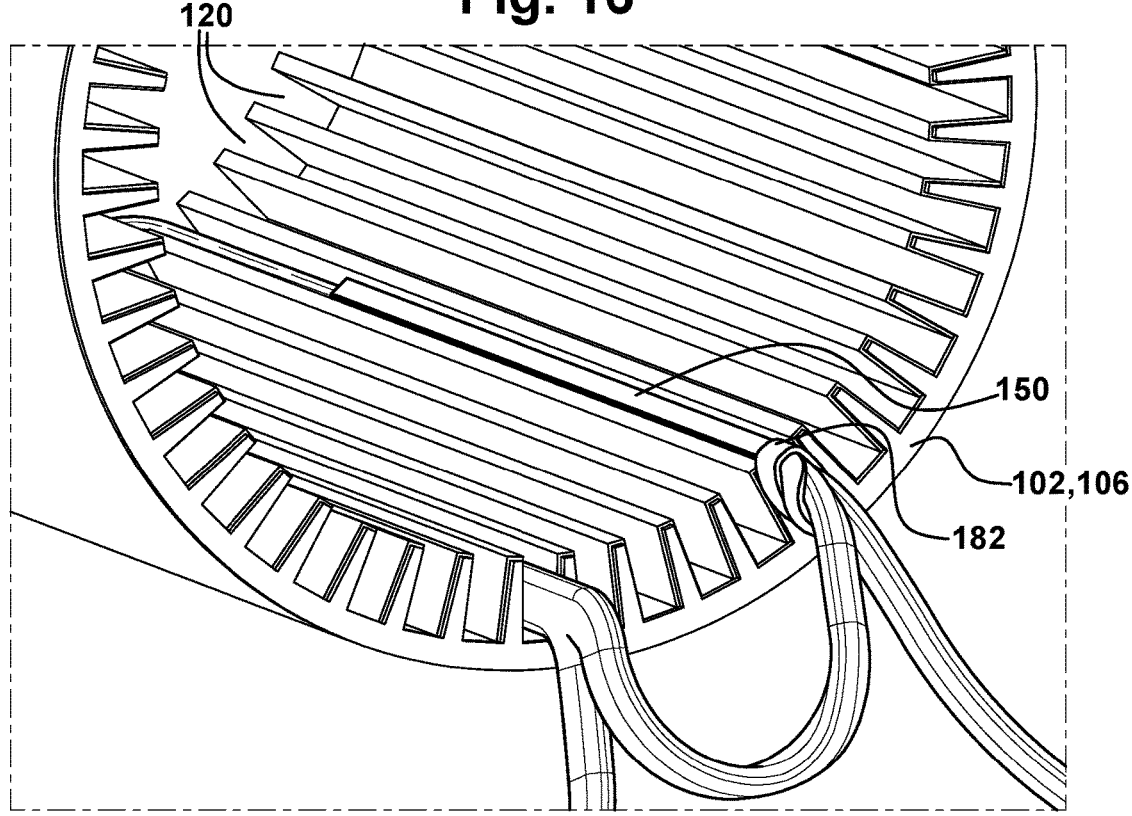

A method according to embodiments of the disclosure will now be described. The method may include, as shown in FIGS. 3 and 5-14, forming resin dam 160 around conductive winding 118 at axial end 130 and/or 132 of slot 120 in electric component 102 of electric machine 100. Conductive winding 118 extends out of axial end(s) 130, 132 of slot(s) 120, and various conductive windings 118 loop back-and-forth through electric component 102 in a known fashion. Resin dams 160 may be formed using any technique and format described herein. For example, as shown in the perspective views of FIGS. 15 and 16, forming resin dams 160 may include wrapping a length 182 of flexible material around conductive winding 118 at first axial end 130 of slot 120. Optionally, as shown in FIGS. 4-6 and 8, forming resin dams 160 may also include positioning length 142 of the flexible material between conductive winding 118 and a bottom 144 of slot 120, wherein length 142 and length 182 are coextensive. Optionally, as shown in FIGS. 5, 7, 8, and 17, forming resin dams 160 may also include positioning length 150 of the flexible material over radially inner side 152 of conductive winding 118 in one of: slot 120 in which length 142 is positioned, or, as shown in FIG. 9B, another slot 120 in electric component 102 adjacent to slot 120 in which length 142 is positioned. In certain embodiments, length 142, 150 182 are coextensive, i.e., a single length. In other embodiments, each length 142, 150, 182 may be separate, or two sequential lengths may be coextensive. Resin dams 160 may be forced against axial ends 130, 132 of slots 120 to block at least space 162 between conductive winding 118 and inner surface 164 of slot 120.

Figure 18:
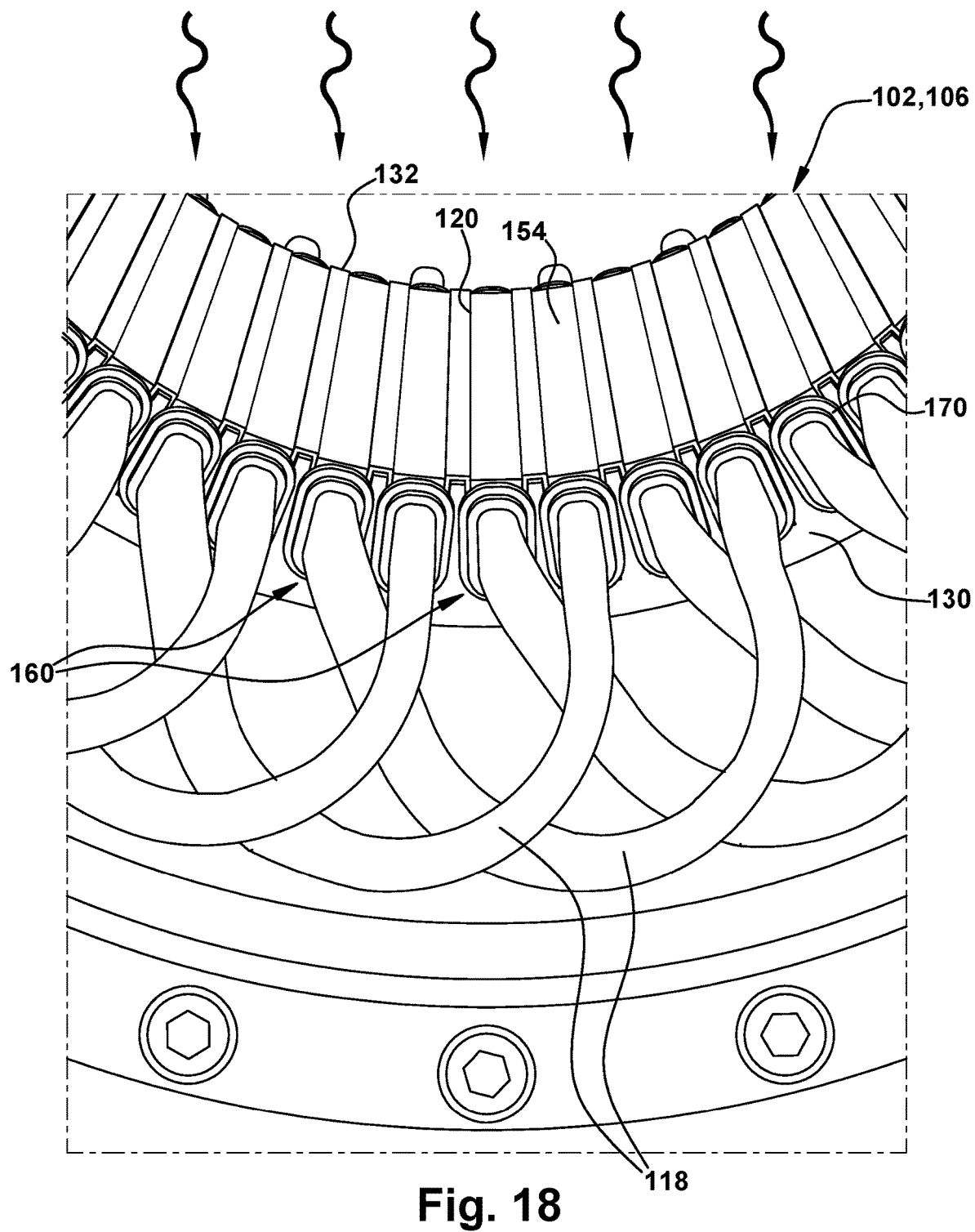
Figure 19:
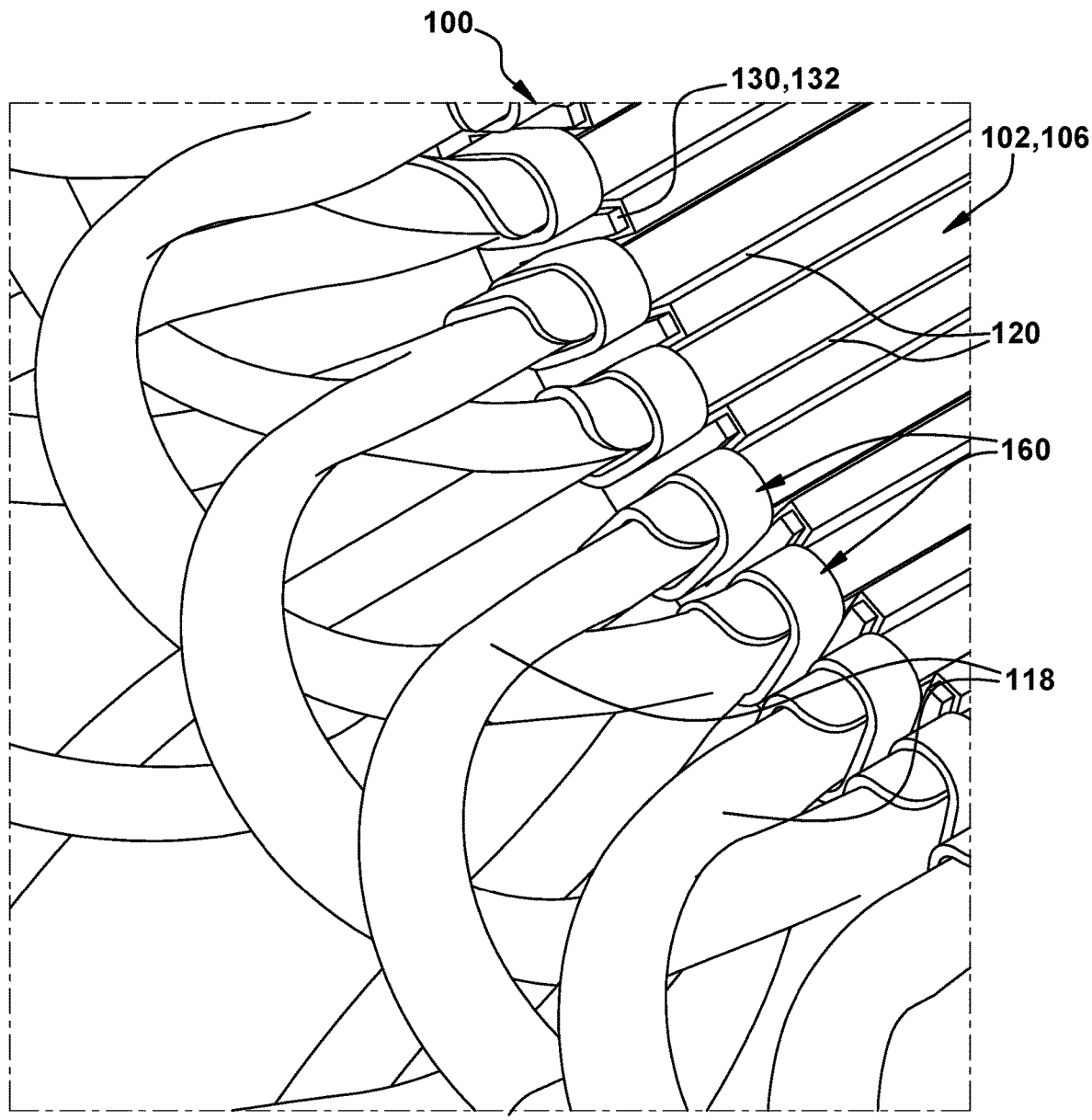
Figure 20:
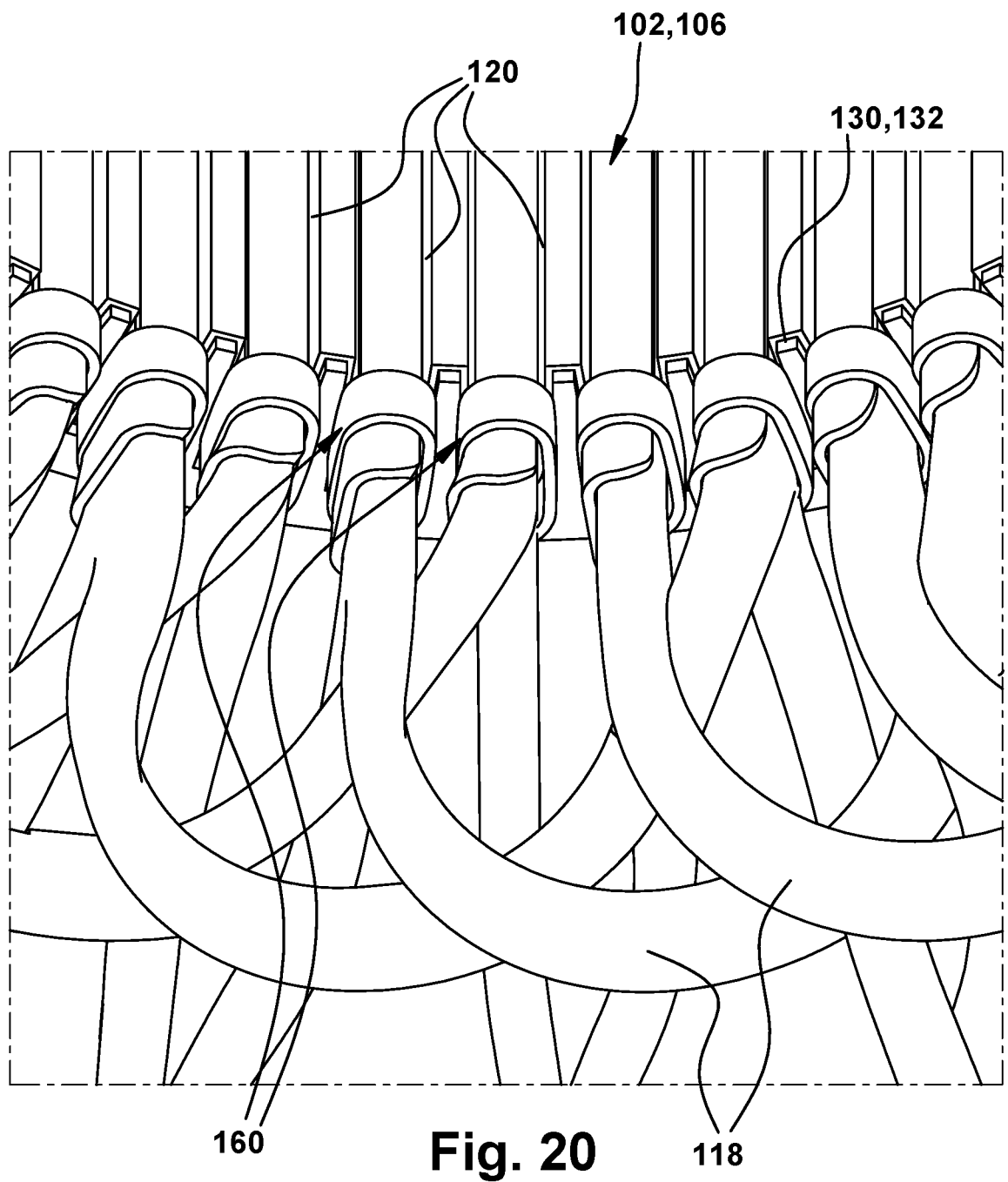

The method may also include applying a liquid resin to conductive winding 118 and slot 120. The liquid resin application may include any now known or later developed vacuum pressure impregnation (VPI) process. As shown in the perspective views of FIGS. 18-20, resin dams 160 block liquid communication of the liquid resin through at least space 162 between conductive winding 118 and inner surface 164 of slot 120 at axial end(s) 130, 132 of slots 120. The method also includes, as also shown in FIG. 18 (curved arrows), curing the liquid resin resulting in an insulating resin 170 in slots 120, around conductive windings 118 and against resin dams 160 at axial end(s) 130, 132 of slots 120. The curing process can include any now known or later developed thermal process appropriate for the insulating resin used. The curing process can include rotation of the electric component. As shown in for example FIGS. 18-20, the cured and solidified insulating resin 170 is in slot(s) 120 and against resin dams 160. Insulating resin 170, where possible, is also embedded in resin dams 160, and may surround resin dams 160. Resin dams 160 do not need to be removed, and may remain part of electric component 102, e.g., stator 106, of electric machine 100.

Embodiments of the disclosure provide various technical and commercial advantages, examples of which are discussed herein. For example, the teachings of the disclosure allow for the full insulation of conductive windings 118 and slots 120, which allows for decreased thin areas or voids in the insulation and reduces any partial electrical discharge, i.e., coronas, resulting in better performance of electric machine 100.

The foregoing drawings show some of the processing associated according to several embodiments of this disclosure. In this regard, each drawing represents a step or process associated with embodiments of the method described. It should also be noted that in some alternative implementations, the acts noted in the drawings may occur out of the order noted in the figure or, for example, may in fact be executed substantially concurrently or in the reverse order, depending upon the act involved.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. An electric component for an electric machine, the electric component comprising:
a body having a slot defined therein;
a conductive winding extending out of a first axial end of the slot;
a first resin dam around the conductive winding at the first axial end of the slot, wherein the first resin dam blocks liquid communication through at least a space between the conductive winding and an inner surface of the slot at the first axial end of the slot, wherein the first resin dam includes a length of flexible material wrapped around the conductive winding extending out at the first axial end of the slot; and
an insulating resin in the slot and against the first resin dam at the first axial end of the slot.

2. The electric component of claim 1, wherein the flexible material includes a fabric including interstitial spaces therein, and wherein the insulating resin is embedded in interstitial spaces of the fabric.

3. The electric component of claim 1, wherein the length of flexible material also extends between the conductive winding and a bottom of the slot.

4. The electric component of claim 3, wherein the length of flexible material also extends over a radially inner side of the conductive winding in the slot.

5. The electric component of claim 1, wherein the length of flexible material also extends over a radially inner side of the conductive winding in the slot.

6. The electric component of claim 1, wherein the slot in the electric component includes a plurality of slots in the electric component, each slot including the conductive winding extending out of the first axial end thereof, and
wherein the first resin dam includes a plurality of first resin dams, one first resin dam extending around the conductive winding at the first axial end of each slot of the plurality of slots, and
wherein the insulating resin is in each slot and around each first resin dam at the first axial end of each slot.

7. The electric component of claim 6, wherein the first resin dams include at least one length of flexible material wrapped around the conductive winding at the first axial end of at least one slot of the plurality of slots.

8. The electric component of claim 1, further comprising a second resin dam around the conductive winding at a second axial end of the slot opposite the first axial end, wherein the conductive winding extends out of the second axial end of the slot and the second resin dam blocks liquid communication through at least a space between the conductive winding and the inner surface of the slot at the second axial end of the slot.

9. The electric component of claim 8, wherein the first resin dam and the second resin dam include a length of flexible material wrapped around the conductive winding at the first axial end of the slot and at the second axial end of the slot.

10. The electric component of claim 1, wherein the first resin dam includes a dam member extending radially from the conductive winding at a location configured to abut the first axial end of the slot.

11. The electric component of claim 10, wherein the conductive winding includes a conductive core and an insulative covering over the conductive core, and the dam member includes a flexible material extending partially under the insulative covering of the conductive winding.

12. The electric component of claim 10, wherein the first resin dam includes a fastener configured to couple the dam member to an exterior surface of the conductive winding.

13. An electric machine having an axis, the electric machine comprising:
an electric component including a plurality of slots defined in a body thereof, each slot extending radially and axially relative to the axis of the electric machine;
a conductive winding in each slot and extending out of a first axial end of each slot;
a first resin dam at the first axial end of at least one slot of the plurality of slots and around the conductive winding in the at least one slot, wherein the first resin dam blocks liquid communication through at least a space between the conductive winding and an inner surface of the at least one slot at the first axial end of the at least one slot, wherein the first resin dam includes a length of flexible material wrapped around the conductive winding extending out at the first axial end of the slot, the flexible material including a fabric having interstitial spaces therein and the insulating resin is embedded in the interstitial spaces of the fabric; and
an insulating resin in the at least one slot and against the first resin dam.

14. The electric machine of claim 13, wherein the length of flexible material also extends between the conductive winding and a bottom of a respective slot in which the conductive winding is located.

15. The electric machine of claim 14, wherein the length of flexible material also extends over a radially inner side of the conductive winding in the respective slot in which the conductive winding is located, and the length of flexible material also blocks liquid communication from over the conductive winding at the radially inner side of the conductive winding at the first axial end of the respective slot.

16. The electric machine of claim 13, wherein the length of flexible material also extends over a radially inner side of the conductive winding in the respective slot in which the conductive winding is located.

17. The electric machine of claim 13, wherein the first resin dam includes a first resin dam extending around the conductive winding at the first axial end of each slot of the plurality of slots, and wherein the insulating resin is in each slot and around each first resin dam at the first axial end of each slot.

18. The electric machine of claim 17, wherein the first resin dams include at least one length of flexible material wrapped around the conductive winding at the first axial end of each slot of the plurality of slots.

19. The electric machine of claim 13, further comprising a second resin dam around the conductive winding at a second axial end of each slot opposite the first axial end, wherein the conductive winding extends out of the second axial end of each slot and the second resin dam blocks liquid communication through at least a space between the conductive winding and the inner surface of each slot at the second axial end of each slot.

20. The electric machine of claim 19, wherein the first resin dam and the second resin dam include a length of flexible material wrapped around the conductive winding at the first axial end of each slot and at the second axial end of each slot.

21. The electric machine of claim 13, wherein the first resin dam includes a dam member extending radially from the conductive winding at a location configured to abut the first axial end of the slot.

22. The electric machine of claim 21, wherein the conductive winding includes a conductive core and an insulative covering over the conductive core, and the dam member includes a flexible material extending partially under the insulative covering of the conductive winding.

23. The electric machine of claim 21, wherein the first resin dam includes a fastener configured to couple the dam member to an exterior surface of the conductive winding.

24. A method, comprising:
forming a first resin dam around a conductive winding at a first axial end of a slot in an electric component of an electric machine, the conductive winding extending out of the first axial end of the slot;
applying a liquid resin to the conductive winding and the slot, the first resin dam blocking liquid communication of the liquid resin through a space between the conductive winding and an inner surface of the slot at the first axial end of the slot, wherein the first resin dam includes a length of flexible material wrapped around the conductive winding extending out at the first axial end of the slot; and
curing the liquid resin resulting in an insulating resin in the slot, around the conductive winding and against the first resin dam at the first axial end of the slot.

25. The method of claim 24, further comprising positioning a second length of the flexible material between the conductive winding and a bottom of the slot, wherein the first length and the second length are coextensive.

26. The method of claim 25, further comprising positioning a third length of the flexible material over a radially inner side of the conductive winding in one of: the slot in which the second length is positioned, or another slot in the electric component adjacent to the slot in which the second length is positioned, wherein the first length, the second length and the third length are coextensive.

* * * * *